United States Patent [19]

Albats et al.

[11] Patent Number: 5,235,185
[45] Date of Patent: Aug. 10, 1993

[54] FORMATION SIGMA MEASUREMENT FROM THERMAL NEUTRON DETECTION

[75] Inventors: Paul Albats, Ridgefield, Conn.; Russell C. Hertzog, Missouri City, Tex.; Mehrzad Mahdavi, Monmouth Junction, N.J.

[73] Assignee: Schlumberger Technology Corporation, New York, N.Y.

[21] Appl. No.: 819,541

[22] Filed: Jan. 9, 1992

[51] Int. Cl.$^5$ .......................... G01V 5/10; G01V 5/14
[52] U.S. Cl. .................... 250/269; 250/266; 250/270
[58] Field of Search ............... 250/269, 270, 262, 264, 250/265, 266

[56] References Cited

U.S. PATENT DOCUMENTS

| | | | |
|---|---|---|---|
| 3,420,998 | 1/1969 | Mills, Jr. | 250/265 |
| 3,462,600 | 8/1969 | Dewan | 250/269 |
| 4,122,338 | 10/1978 | Smith, Jr. et al. | 250/269 |
| 4,570,067 | 2/1986 | Gadeken | 250/269 |
| 4,721,853 | 1/1988 | Wraight | 250/269 |
| 4,760,252 | 7/1988 | Albats et al. | 250/266 |
| 4,947,040 | 8/1990 | Mahdavi et al. | 250/266 |
| 4,972,082 | 11/1990 | Loomis et al. | 250/269 |
| 5,051,581 | 9/1991 | Hertzog et al. | 250/266 |

OTHER PUBLICATIONS

Youmans et al, "Neutron Lifetime, A New Nuclear Log", Trans. J. Petroleum Tech., Mar. 19, 1964.

J. R. Olesen et al, "Dual-Burst Thermal Decay Time Data Processing and Examples". SPWLA Logging Symposium, Jun. 29–Jul. 2, 1987.

Primary Examiner—Carolyn E. Fields
Attorney, Agent, or Firm—L. James Ristas; Leonard W. Pojunas

[57] ABSTRACT

A tool which contains a pulsed accelerator neutron source and means for making timing measurements of the thermal neutron response in a localized portion of the environment immediately surrounding the borehole. Formation sigma is determined by parameterizing the detected thermal neutron decay curve, preferably with a diffusion model similar to that known in the art for determining formation sigma on the basis of gamma ray time distributions. In a more comprehensive embodiment of the present invention, which includes a gamma detector in the tool, formation sigma can be measured in parallel using both gamma ray and thermal neutron decay characteristics. Deviations between the neutron and gamma-based signals that occur as the tool traverses the borehole, provide useful indications of local effects immediately surrounding the borehole.

37 Claims, 19 Drawing Sheets

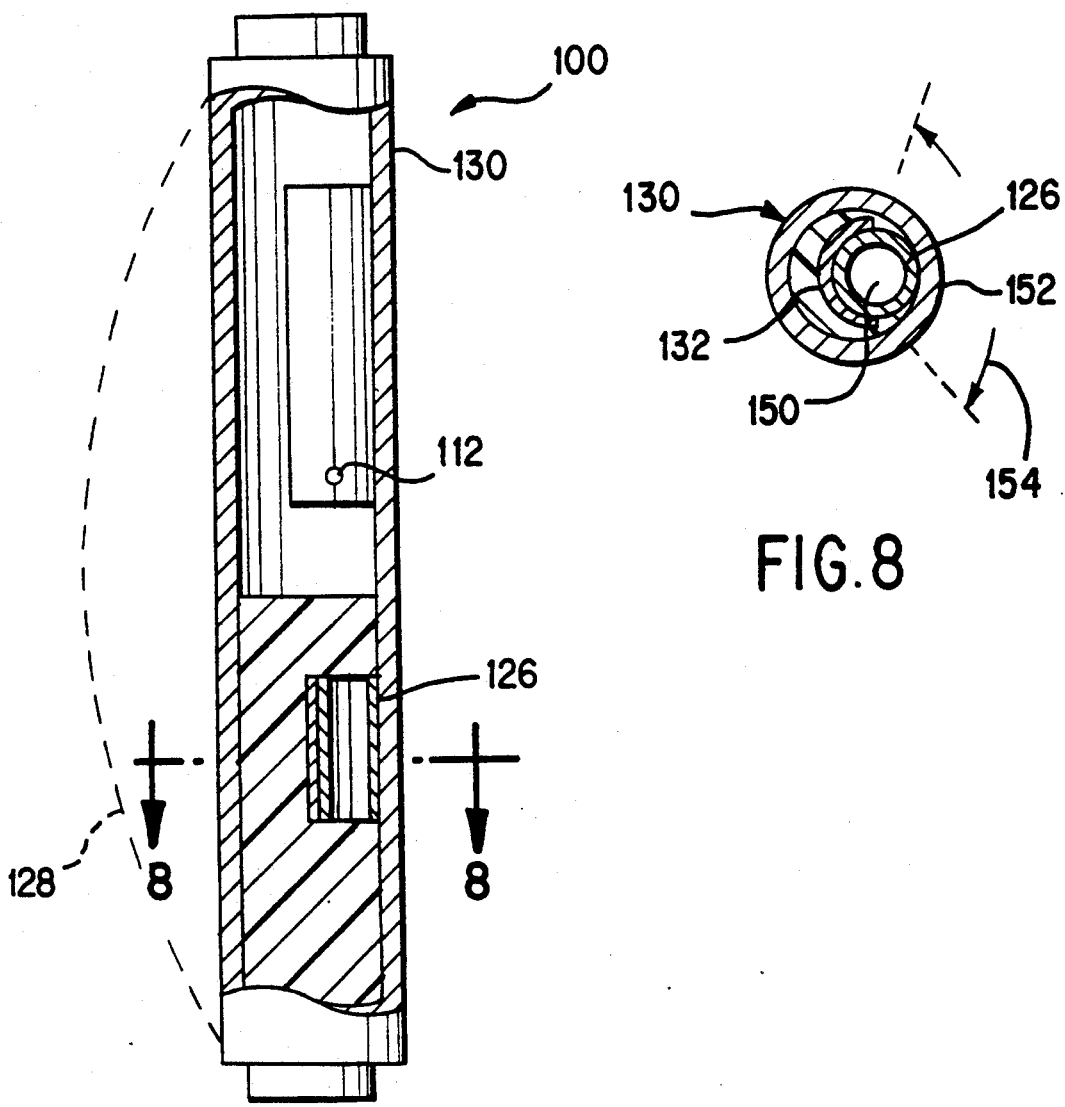
FIG. 2
FIG. 8
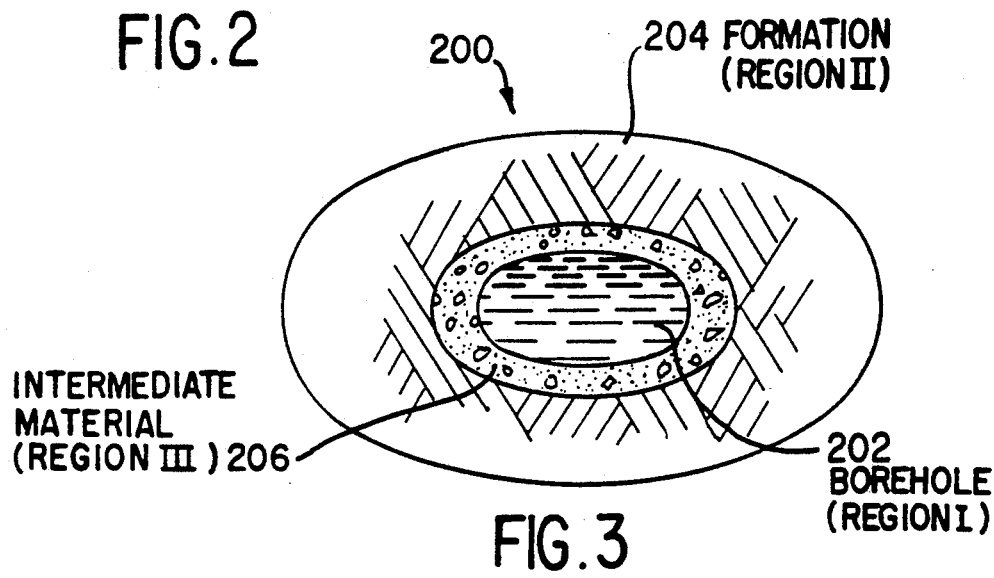
FIG. 3

BASIC SET

- LIMESTONE, 8" BH
- 0, 15, 40 pu AND WATER TANK
- FRESH AND SALINE (200 kppm) BH
- 0, 0.5, 1.0, 1.5, 2.0 in. STANDOFF

LITHOLOGY; BH SIZE EFFECT; FORMATION SIGMA EF

- SANDSTONE, DOLOMITE; 0, 15, 40 pu
- 6, 8, 12 in. BH SIZES
- X-OVER IN HIGH SIGMA FORMATIONS

THIN BED SCAN

- LIMESTONE; 13, 40, 14 pu LAYERS
- 0, 1 IN STANDOFF; FRESH AND SALT BH

GAS EFFECT; INVASION MEASUREMENT

- 40 pu DRY LIMESTONE
- CASED HOLE WITH DIFFERENT CEMENT THICKNESS
- INVASION WITH 3 REGIONS

FIG.12

FORMATION SIGMA MEASUREMENT FROM THERMAL NEUTRON DETECTION

BACKGROUND OF THE INVENTION

The present invention relates to a well logging tool for investigating an earth formation surrounding a borehole. More particularly, the invention is directed to method and apparatus for more accurately determining formation characteristics, by improving the tool response to variations in the region closely surrounding the borehole.

The art of determining the characteristics of earth formations to obtain information indicative of hydrocarbon content, is highly developed. In a typical methodology, a logging tool is passed through a borehole in the formation at a controlled rate. A source in the tool irradiates the formation, and sensors spaced from the source in the tool detect the radiation intensity or decay rate resulting from the way in which the formation constituents have interacted with the source radiation.

U.S. Pat. No. 4,721,853 issued to Peter D. Wraight on Jan. 26, 1988, and U.S. Pat. No. 4,760,252 issued to Paul Albats and Stephen Antkiw on Jul. 26, 1988, describe logging tools in which the radiation source is a pulsed accelerator neutron source, of the type used commercially by Schlumberger Technology Corporation under the Minitron trademark. The high energy neutrons (preferably about 14 MeV) penetrate the formation and interact with the formation constituents through various mechanisms, whereby the energy of the neutrons is decreased. At low (thermal) energies, neutrons are captured in the nuclei of the constituents and, upon such capture, the energized nuclei release a gamma ray which is detected in the tool. Since gamma rays are highly energetic and have a relatively long mean-free path, the amplitude and decay time characteristics of the detected gamma rays represent the volume averaged characteristics of the constituents of both the borehole and the surrounding formation. Two primary formation characteristics of interest to the user of these types of tools, are the macroscopic thermal capture cross-section of the formation (formation sigma, or Sigma, in cu units), and formation porosity (in pu units).

U.S. Pat. No. 4,721,853 discloses a method for determining formation sigma from the processing of the count rate decay curve of the gamma rays sensed in the detector. In essence, the decay curve immediately following the pulsing of the source, is used to eliminate the effect of counts due to interactions in the borehole, so that counts due to thermal capture in the formation strongly predominate. The decay time constant of the gamma counts due to thermal neutron capture is then utilized to compute the formation sigma using any one of a variety of known techniques for modeling the interaction of neutrons with matter, e.g., by solving the neutron diffusion equation using terms in which formation sigma is a parameter.

The formation cross section can be determined satisfactorily using the technique of the '853 patent under conditions where the formation constituents do not change quickly as a function of borehole elevation, the material immediately surrounding the borehole has a substantially uniform geometry and natural composition along the full vertical span for which measurements will be taken, and where so-called diffusion "crossover" is not encountered. In general, these conditions are often not available in open hole logging, where crossover, invasion, or thin-bedded formations adversely affect the accuracy of formation sigma as determined using the technique disclosed in the '853 patent.

The primary purpose of the tool disclosed in U.S. Pat. No. 4,760,252 is determining formation porosity. The tool includes detectors that are sensitive to neutrons that have slowed down from their high initial source energy, as well as a detector sensitive to gamma rays. Detectors sensitive to epithermal neutrons and spaced at different distances from the source, are utilized to determine ratio or cross-plot porosity. The spatial resolution for formation porosity is enhanced by utilizing two detectors sensitive to neutrons at the same energy but oriented so as to have different angular zones of receptivity at the same elevation in the borehole.

The '252 patent also discloses the measurement of formation sigma from time-dependent count rates of gamma rays, and from the relationship of epithermal to thermal count rates in two respective detectors equally spaced from the source. Although brief mention is made of the possibility that local characteristics of the formation such as formation sigma can be derived based on measurements from a detector sensitive to thermal neutrons, there is no disclosure of how the output from any of the thermal detectors can be utilized to obtain formation sigma, or to account for standoff, invasion, or thin bed effects when formation sigma or porosity are determined using gamma ray detectors or epithermal neutron detectors.

Thus, although the tools described in the patents mentioned above have advanced the state-of-the-art in well logging techniques, the need exists for obtaining higher local resolution in the measurement of formation sigma, preferably in a manner that is independent of borehole conditions.

SUMMARY OF THE INVENTION

Accordingly, it is an object of the present invention to provide an improved method and apparatus for more accurately characterizing the material immediately surrounding a borehole in a logged earth formation.

It is a further object to accurately measure, with high precision, formation sigma corrected for diffusion effects and independent of borehole conditions or variations.

It is still another object to accurately measure formation sigma under different conditions often encountered in open hole logging, such as diffusion crossover or standoff.

It is a more particular object to obtain measurements of the thermal capture cross section of the material immediately surrounding the borehole with very high vertical resolution, on the order of a few inches, thereby improving the performance of the logging tool with respect to the determination of formation sigma and porosity, especially for thin bed formations.

It is another object of the invention to measure and account for the effects of standoff in the measurement of formation porosity.

These and other objects can be achieved by the use of a tool which contains a pulsed accelerator neutron source and means for making timing measurements of the thermal neutron response in a localized portion of the environment immediately surrounding the borehole. Formation sigma is determined by parameterizing the detected thermal neutron decay curve, preferably with a diffusion model similar to that known in the art for determining formation sigma on the basis of gamma ray time distributions. In a more comprehensive embodiment of the present invention, which includes a gamma detector in the tool, formation sigma can be measured in parallel using both gamma ray and thermal neutron decay characteristics. Deviations between the neutron and gamma-based signals that occur as the tool traverses the borehole, provide useful indications of local effects immediately surrounding the borehole.

The basis for the greater short range accuracy available with the present invention, is the difference in the physics of thermal neutron and capture gamma ray detection. Thermal neutrons respond to a shallower environment compared to capture gamma rays. A combination of these two different depths of investigation provides an effective means for a three region analysis, e.g., borehole region, shallow region containing artificial constituents immediately surrounding the borehole, and the natural formation region. Analysis of time decay data from both thermal neutron and capture gamma ray detection thus provides the capability for measuring decay characteristics of a three region environment, where the third region between the borehole and the natural formation, includes one or more materials including tubing, casing, cement, standoff, or invasion.

The time dependent neutron detection does not involve background activation, which in known techniques needs to be subtracted before useful information for determining formation sigma can be analyzed. Thus, the statistical precision is much better for the neutron-based determination of formation sigma, than for the gamma-based determination. This improvement can be on the order of ten times better precision for the same number of counts in the decay curve. Moreover, the neutron measurement does not need the burst-off background cycle of the source, such as disclosed in U.S. Pat. No. 4,721,853. Another difference is that the formation and borehole components are decoupled in the neutron measurement, by the shielding design in the tool. A significant feature of the thermal detector, is the eccentric geometry and shielded orientation of the sensitive volume within the tool, so as to respond to thermal neutrons through an angularly limited "window" at one side of the tool. With such detector configuration, the detector response to borehole neutrons is minimized and, since the tool is typically biased against the borehole wall during its traverse, the thermal detector response is dominated by the thermal neutron population in the material defining the wall of the borehole.

This simplifies the processing required to obtain intrinsic formation sigma. In the absence of standoff, single component processing with a diffusion correction parameter g utilizing the form $$N(t) = A_F t^{-g} e^{-t/tauF}$$

fit over the late part of the thermal neutron decay curve is usually sufficient to accurately determine tauF and sigma.

A comparison of the neutron and gamma decay curves can reveal crossover cases, i.e., regions in which formation sigma is greater than borehole sigma, where the neutron-based determination of formation sigma will provide a better measure of intrinsic sigma. Moreover, the neutron-based determination of sigma provides better vertical resolution, although the gamma-based determination provides a deeper measurement, which has advantages in cases such as performing measurements through tubing with highly absorptive fluids.

The composite tool preferably further includes spaced apart detectors sensitive to epithermal neutrons, from which porosity is determined in a conventional manner, but corrected for effects that are discernible only as a result of the time dependent processing of the thermal neutron detection signals. In this embodiment, time integrated count rates are obtained from the gamma detector to obtain both a source neutron count at a high energy threshold, and capture gamma ray intensity at a lower energy threshold. These are made in addition to the gamma ray and neutron event time distribution measurements.

A basic inventive tool having only a pulsed accelerator neutron source and a spaced thermal neutron detector can be provided, i.e., no capture gamma rays are detected and processed. This tool is cost-effective where only a "focused" measurement of the material distribution close to the borehole is needed. This tool can accurately measure formation sigma with high vertical resolution and accuracy, including thin bed and crossover cases. Two material regions can be identified from the measured neutron time distributions: a region immediately in front of the detector (including the presence of standoff, cement with case, or invasion) and the formation proper at a slightly greater distance in front of the detector.

BRIEF DESCRIPTION OF THE DRAWINGS

These and other objects and advantages of the invention will be more evident from the following detailed description and accompanying drawings, in which:

FIG. 2 is a schematic elevation view of a second embodiment, representing the simplest form of the present invention, which does not include epithermal neutron or capture gamma detectors;

FIG. 3 is a schematic representation of a three region borehole environment to be investigated by the tools shown in FIGS. 1 and 2;

FIGS. 7 and 8 are section views of the first and second embodiments taken through lines 7—7 of FIG. 1 and 8—8 of FIG. 2 respectively, showing the eccentrically mounted thermal detector;

FIG. 12 is a summary of the subset of borehole environment conditions in which the tool of the present invention was tested;

DESCRIPTION OF THE PREFERRED EMBODIMENT

Hardware and Physical Environment

Figure 1:
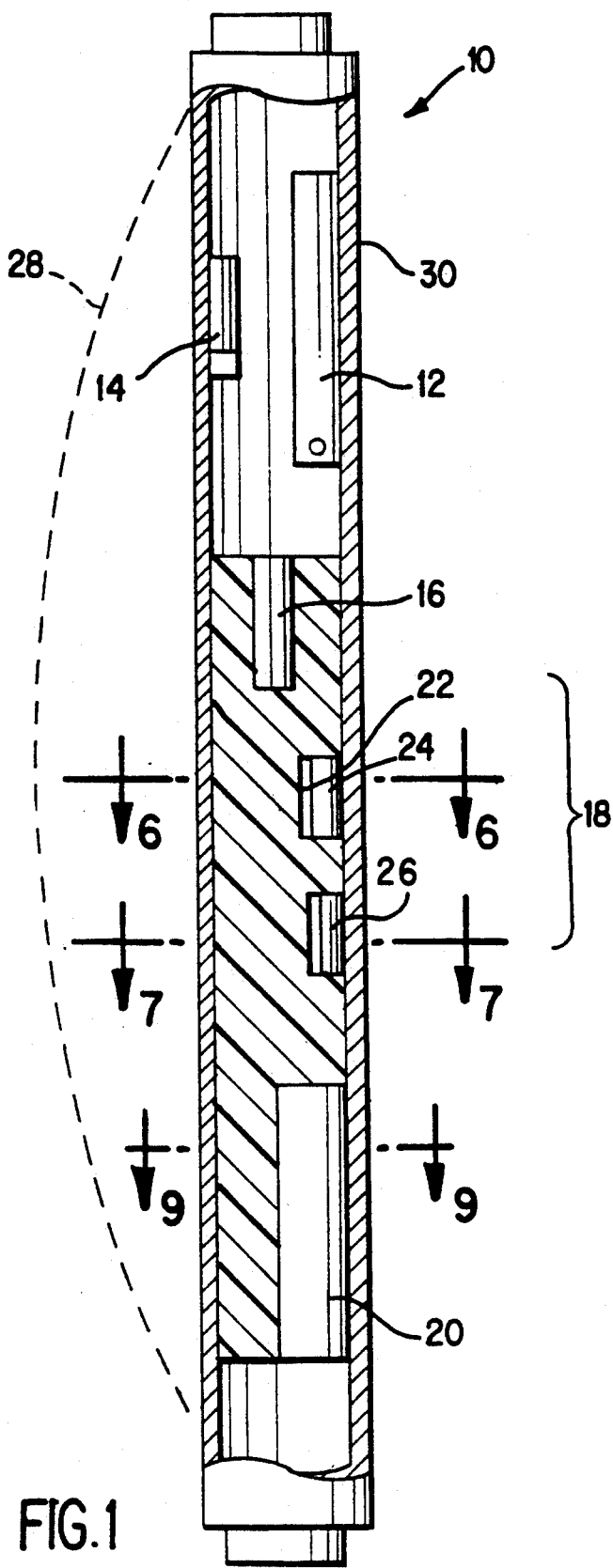
FIGS. 1 is a schematic elevation view of the tool in accordance with a first embodiment of the invention, which includes a neutron detector, epithermal neutron detectors, and a capture gamma ray detector.

Although a variety of implementations of the invention may be achieved in practice, two embodiments of the invention are shown schematically in FIGS. 1 and 2. In FIG. 1, a comprehensive well-logging tool, or sonde 10, for investigating the thermal neutron capture cross-section and other parameters of an earth formation surrounding a borehole is shown. The sonde 10 includes a pulsed accelerator neutron source 12, a neutron source monitor and gamma detector 14, a near epithermal neutron detector 16, detector array 18, and a far epithermal neutron detector 20. The array 18 has two epithermal neutron detectors 22,24 eccentrically mounted at the same elevation, and a thermal neutron detector 26 mounted eccentrically in longitudinally spaced relation from detector 24.

The tool 10 is intended to be a sidewall tool; a bow spring, indicated schematically at 28, or other conventional device, is provided on the tool to urge the substantially cylindrical housing 30 against the borehole wall. The tool may be used for open hole logging, in cased holes, and, if desired, may be sized for through-tubing use.

An alternative embodiment 100 is shown in FIG. 2, in which only the thermal neutron detection aspect of the embodiment of FIG. 1 has been retained. Other variations of the embodiment of FIG. 1 can include one or more of (1) the elimination of epithermal detectors 22,24, (2) the elimination of epithermal detectors 16 and 20, or (3) providing one epithermal and two thermal neutron detectors in array 18. FIG. 2 represents the minimum sonde configuration 100 of the present invention, i.e., housing 130, source 112, and thermal neutron detector 126, along with the preferred bow spring 128.

As is well known in the field of well logging, the tool 10,100 is typically lowered into and then pulled out of a substantially vertical borehole in the earth at a controlled speed. FIG. 3 is a schematic representation of the borehole environment 200 at an arbitrary horizontal plane through the borehole. As a generic representation of the borehole environment, it is convenient to make reference to three regions which will be referred herein by Roman numerals as Regions I, II and III. Region I is the borehole 202 per se, which typically contains a fluid artificially introduced into the borehole for pressure balance and other purposes. Region II is the undisturbed, natural earth formation 204 surrounding the borehole 102, having typical constituents including various rocks and "pores" which may contain gas, water, oil, or other fluids. The second region is thus in a substantially natural state despite the presence of the borehole and it is the character of the second region which is of primary interest to the user of the present invention. Region III includes all material 206 between the borehole per se 202 and the natural earth formation 204. This will be referred to as the intermediate or shallow region and would contain casing and cement to the extent these are present. Also included in Region III are the standoff and invaded volumes, to the extent present.

Thus, the borehole environment 200 in its simplest form can be represented as a two-region environment having a borehole region 202 of substantially uniform, substantially cylindrical cross-section containing borehole fluid, and a second region 206 having an internal boundary defined by the substantially cylindrical wall of the borehole 202, and extending radially outward in all directions without invasion by borehole fluids and without wall irregularities that would produce stand-offs. In this simplest environment, the third region 206 has an infinitesimal, or negligible thickness. In a more complex environment, the third region 206 would include significant thicknesses of any one or all of tubing, casing, cement, and formation irregularities which produce invaded material or standoff.

Figure 4:
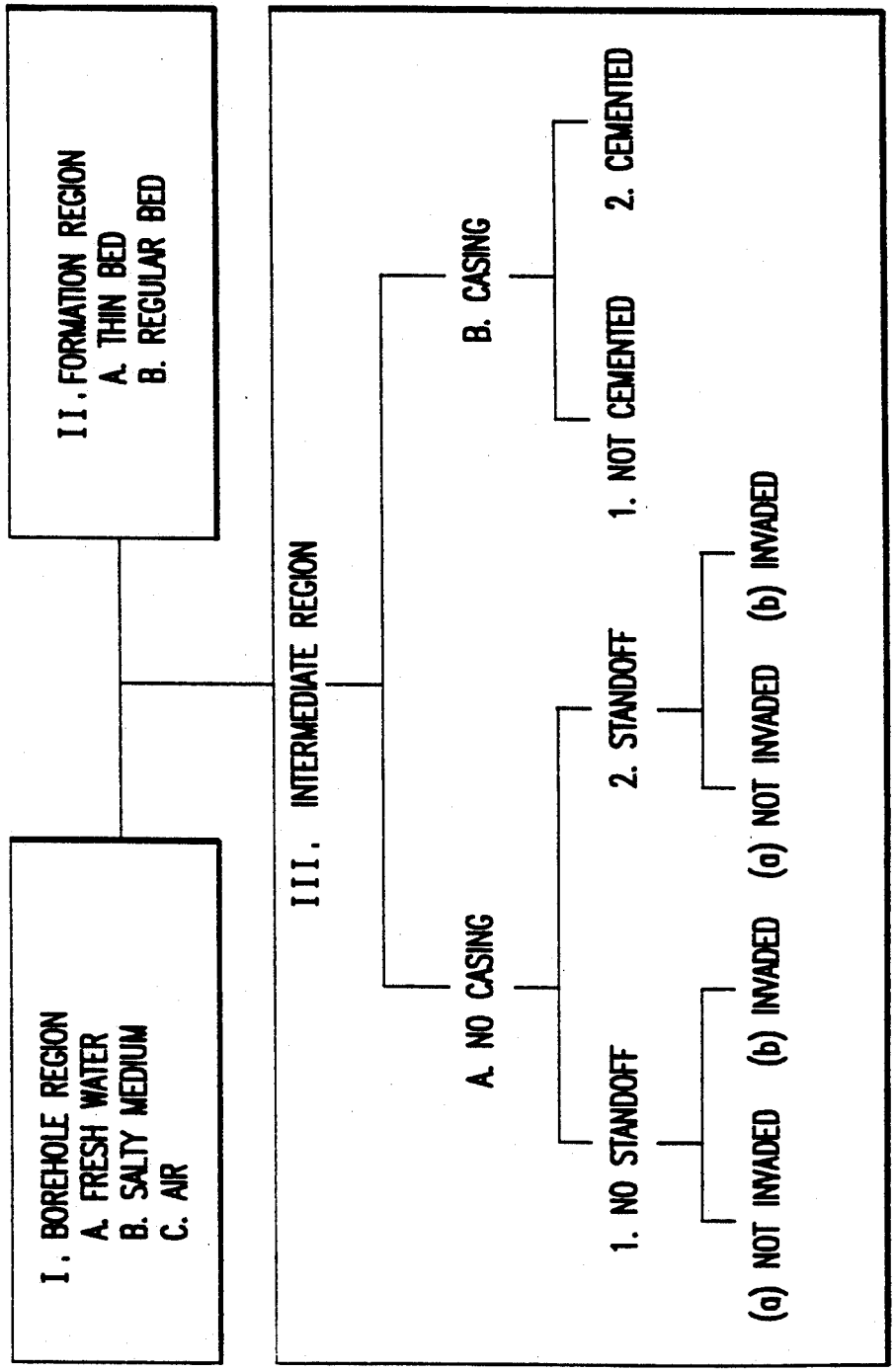
FIG. 4 is a diagram representing different types of three region borehole environments which may be present during the investigation of an earth formation.

FIG. 4 summarizes in a more systematic form, the permutations of borehole environments of the type represented in FIG. 3. Each of the three regions is represented by a closed rectangular box, and the most significant variables of interest with respect to the present invention are listed in a hierarchical scheme within each box.

Thus, it may be seen that in Region I, the borehole fluid medium may be fresh water, salt water within a range of salinity, air, oil, or gas. The natural formation of Region II may be regular, in the sense that changes in the formation constituents as one moves vertically in parallel with the borehole are gradual or the constituent material appears in relatively thick beds or layers. Alternatively, the formation may include what are commonly referred to as thin beds, in which the vertical thickness of some constituent layers is small, i.e., less than about three times the spacing between the source 12 and the closest detector in the tool. In Region III, the material surrounding the borehole may be either uncased or cased. Where casing is present, it may or may not be cemented in place. Conditions of particular interest where no casing is present, include whether the formation surrounding the borehole produces standoff. Standoff may be present with or without invasion of the borehole fluid into the formation. The representational scheme of FIG. 4 permits the ready identification of a particular condition of interest by specifying, for example, the triplet [I.A.] [II.A.] [III.A.1.(a)].

As will be evident from the description of the invention appearing below, the first embodiment 10, shown in FIG. 1, would be used where volume-averaged and/or formation characteristics existing relatively far from the borehole are desired, in conjunction with the improved neutron-based measurements of the material immediately surrounding the borehole. Thus, the tool 10 depicted in FIG. 1 includes the capability of comparing the gamma-based and neutron-based measurements for the same property, such as formation sigma, as a function of borehole elevation. Conclusions can be drawn based on the comparison, that could not be drawn from only one of such measurements. The tool 100 depicted in FIG. 2 would preferably be used where, for example, the borehole had previously been logged with a gamma-based tool, or where only measurements of the type that are particularly effective using the neutron-based techniques of the present invention are desired. As a minimum, the present invention requires the presence of a neutron source 12,112 which can generate sharp neutron bursts, having a particularly sharp cutoff. A detector 26,126 sensitive to thermal neutrons is located in spaced relation from the source, with its sensitive volume situated at the periphery of the sonde. The neutron source and the neutron thermal detector are coupled to appropriate electronics, signal processing and data processing equipment, such that the time distribution of the detector response can be analyzed as a function of position, or elevation, of the sonde within the borehole.

In the description immediately following, the tool embodiment shown in FIG. 1, as the more comprehensive embodiment, will be set forth in detail. The simpler embodiment 100 shown in FIG. 2 includes a subset of the components of sonde 10 shown in FIG. 1. The structures labeled with a three digit numeric identifier in FIG. 2 correspond with respect to the last two digits, to the structures identified by two digit numerals in FIG. 1. The measurements, signal processing and data processing associated with the time-dependent distribution of thermal neutrons measured in the tool shown in FIG. 1, can be identically performed with the embodiment of the tool as shown in FIG. 2. Thus, the comprehensive tool 10 shown in FIG. 1 may be considered as the basic tool 100 of FIG. 2 according to the invention, augmented by optional features such as the gamma-based and epithermal-based detectors and associated processing. Where the context permits, reference to FIG. 1 should be understood as including FIG. 2, and visa-versa.

Figure 5:
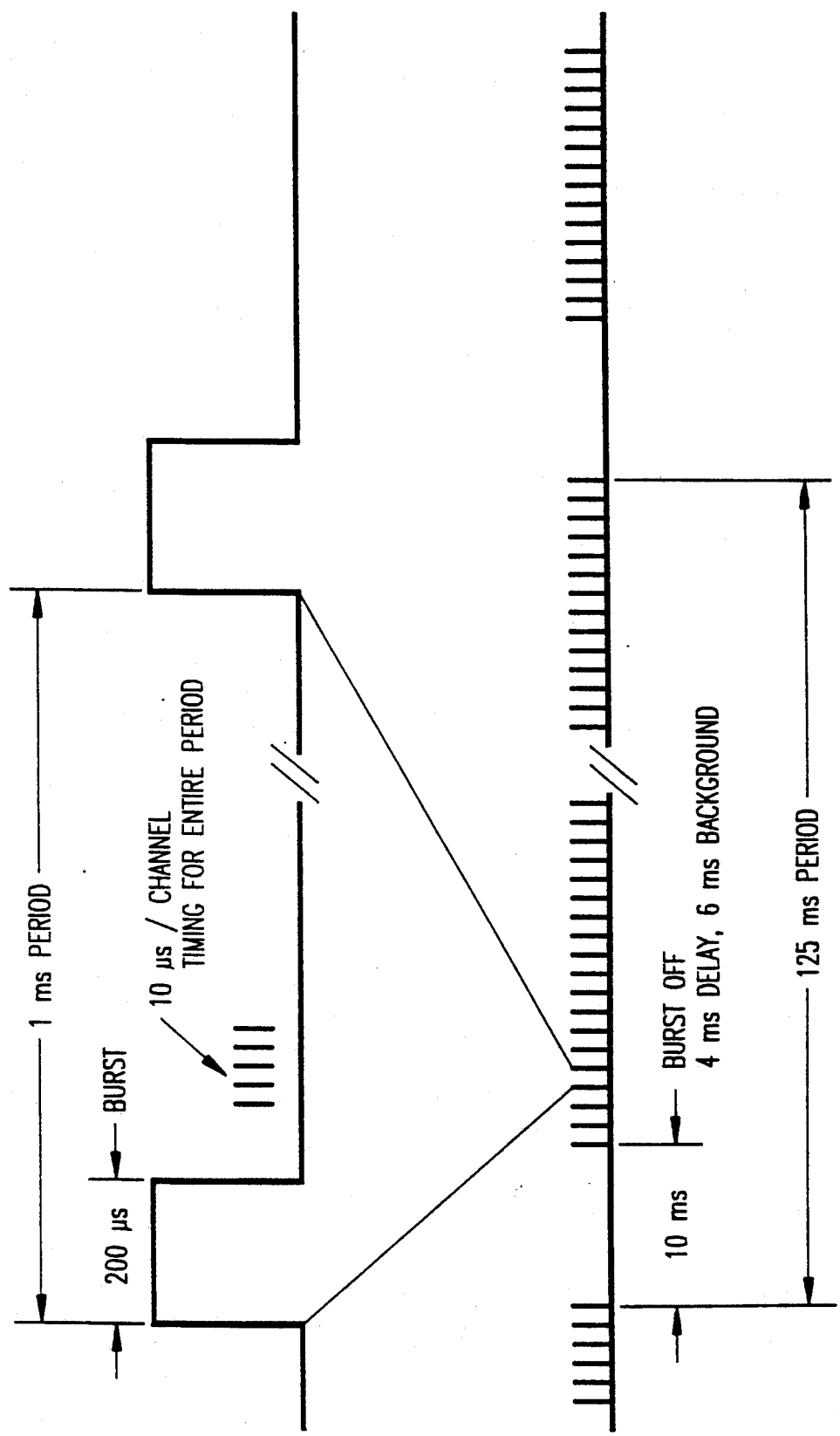
FIG. 5 is a schematic representation of one suitable timing sequence for the tool shown in FIG. 1.

With reference to FIGS. 1 and 5, the neutron accelerator 12 may be of any suitable type, but preferably is a D-T type (14 MeV) source having an output on the order of $5 \times 10^8$ n/sec or greater. The neutron output is pulsed to generate a square wave burst for a duration of 200 us, at a 1 ms period. In general, the pulse duration should be less than about 25 percent of the pulse period. The measured neutron pulse rise and fall times are about 5 us. In general, the rise and fall times should be less than about five percent of the pulse duration. In order to better utilize the gamma ray count rate data for the embodiment of FIG. 1, a background cycle may also be generated. The background cycle is repeated every 125 ms to give a 10 ms interval with no neutron burst. Although this timing is preferred, other timing cycles may also be utilized with the present invention. For example, whereas the presently described mode is for sigma measurement, a different mode for slowing down measurements would have a 10 u burst on a 100 u period. Or, the sigma and slowing down modes can be interleaved, based on the techniques described in U.S. Pat. No. 5,051,581.

The monitor 12 includes a plastic scintillator in an integral mount package with a photomultiplier, to provide both source neutron and gamma ray measurement by using different discriminator thresholds at the detector output. The monitor is positioned to provide acceptable performance for both types of measurements. The two major effects that need to be balanced are that the source neutron density drops off faster than 1/(spacing)$^2$. Also, at the larger spacings, a greater fraction of the detected events have been scattered external to the tool. The decay curve at smaller spacings has an increased background level and a larger borehole-to-formation component. Additional details concerning the monitor itself may be found in U.S. Pat. No. 4,760,252, the disclosure of which is hereby incorporated by reference.

The spacing and shielding of the near (annularly shielded) and far (back shielded) epithermal detectors 16,20 of the embodiment shown in FIG. 1, are substantially the same as described for the near and far epithermal detectors, respectively, in U.S. Pat. No. 4,760,252. The epithermal detectors 22 and 24 and the thermal detector 26 in the array 18, are also similar to the array detectors described in said incorporated patent disclosure. It is within the ordinary skill of practitioners in this field to optimize the diameter, length, and other operating characteristics of these detectors for the required sensitivity and statistical tolerances. In general, however, the neutron detector are preferably in the form of helium-3 (He-3) proportional counter. Those adapted for sensitivity to epithermal neutrons include a cadmium shield to eliminate the influence of thermal neutrons.

Figure 6:
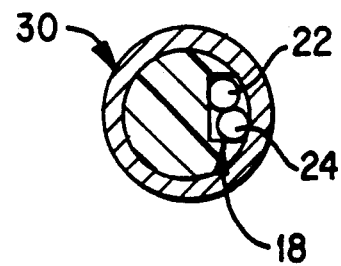
FIG. 6 is a section view of the first embodiment taken through line 6—6 of FIG. 1, showing the eccentrically mounted epithermal detectors in the detector array.
Figure 7:
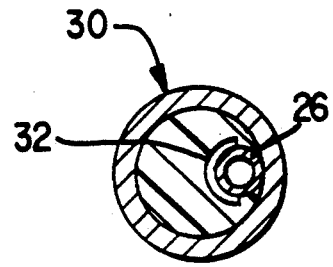
Figure 9:
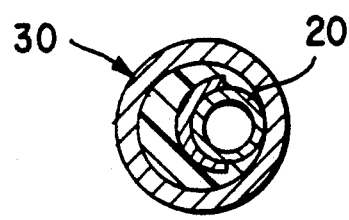
FIG. 9 is a section view through line 9—9 of FIG. 1, showing the far epithermal detector eccentrically located in the tool.

FIGS. 6, 7 and 8 are cross-sectional views of the tool 10 taken through epithermal detectors 22,24, and thermal detector 26 of the array 18, and the far epithermal detector 20, respectively, showing the eccentric mounting. The thermal detector 26 is back shielded 32 so that the sensitive volume is responsive almost exclusively to thermal neutrons which enter the housing 30 from the right in FIG. 7. FIG. 8 is a view similar to FIG. 7, but for the embodiment 100 of FIG. 2, showing the eccentric mounting of the thermal detector 126 with backshielding 132 in casing 130, i.e., the shielding is between the sensitive volume 150 and the sonde axis. This eccentric mounting and backshielding perform somewhat like a still camera lens which has an angularly limited field of view and focuses light onto a sensitive film from a limited range in the field of view. Thus, the sonde has a detection surface 152 for thermal neutrons, which is limited in azimuthal angle 154, preferably less than about 100 degrees, such that substantially all thermal neutron that enter the sensitive volume 150 of the thermal detectors 26,126, have first passed through the detection surface 152. The detectors 26,126 thus have an angular zone of receptivity to thermal neutrons in the Regions II and/or III at a given elevation in the borehole (see FIG. 3).

In an exemplary relationship of the source, monitor and detectors within tool housing 30, the sensitive volume of the combined source monitor and gamma detector 14 is above the minitron source 12. The centers of sensitivity for the near epithermal detector 16 and far epithermal detector 20 are situated below the source 12, and the sensitive volumes of the epithermal and thermal detectors 22,24,26 in the array 18 are centered between the near and far detectors 16,20.

Figure 10:
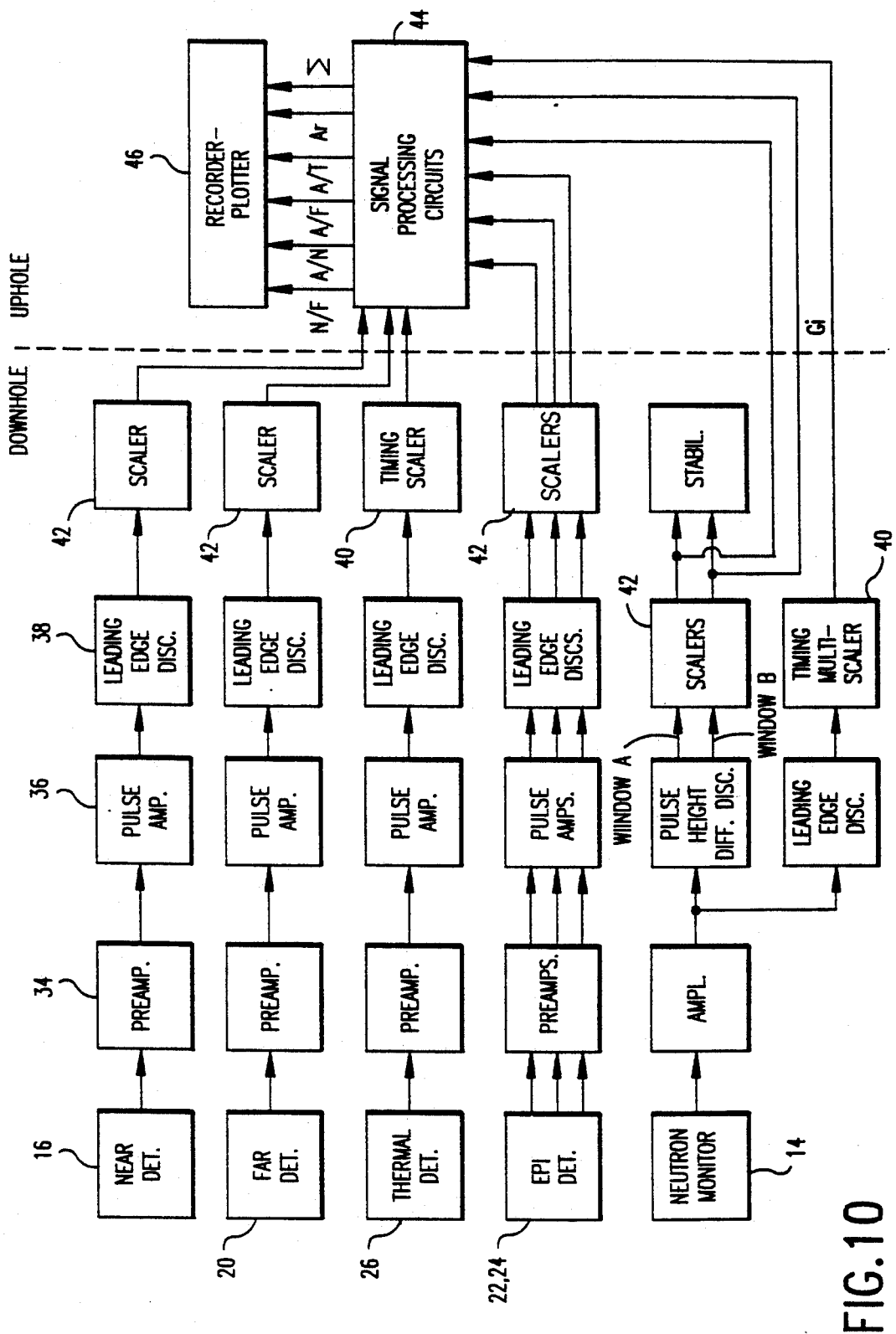
FIG. 10 is a schematic diagram of the detector signal processing circuitry of the tool of FIG. 1.
Figure 13:
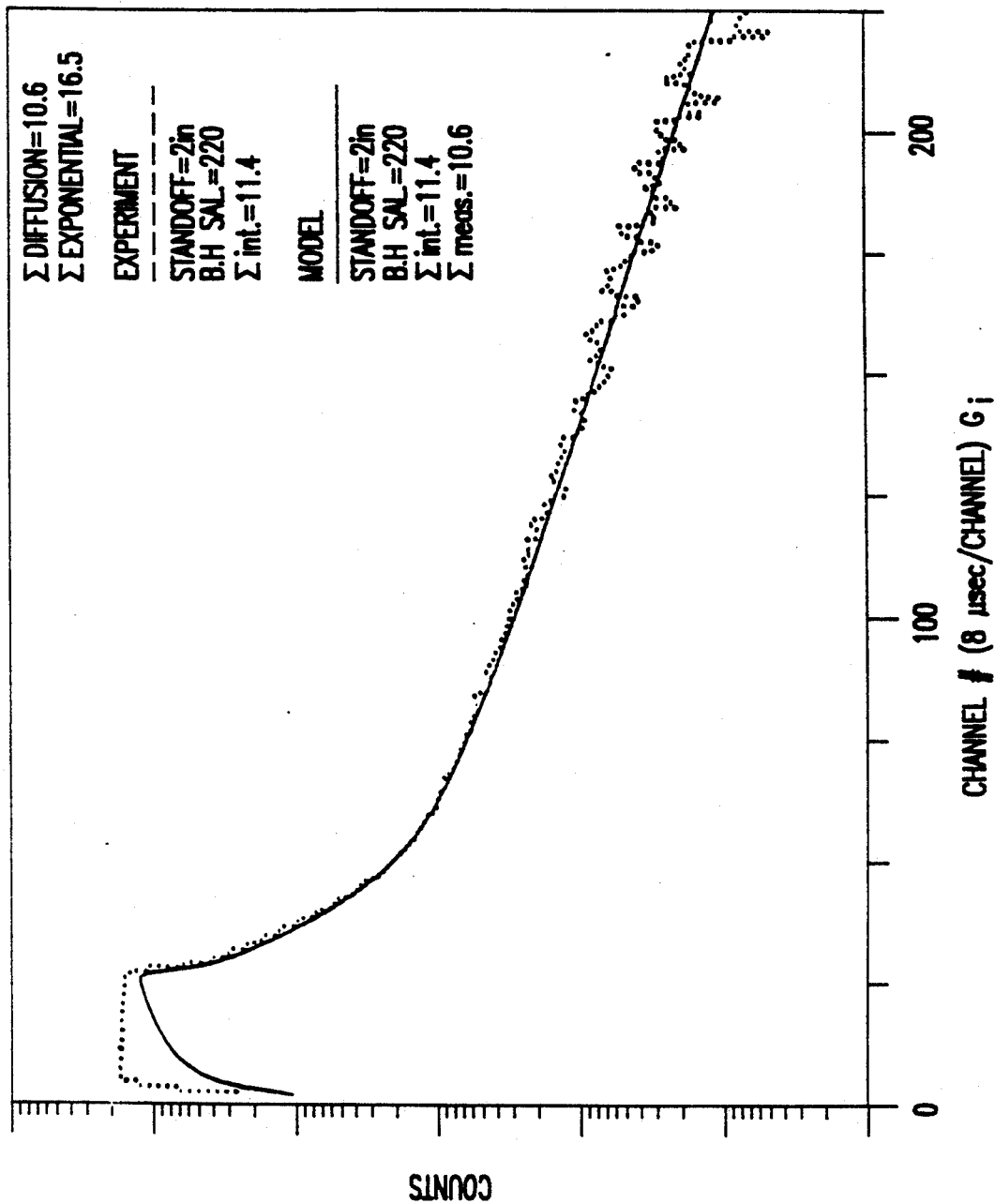
FIG. 13 is a graph showing a time-dependent gamma count rate response of the tool of FIG. 1 to neutron source pulses, where one curve shows the counts measured in each of over two hundred channels having eight microsecond window intervals, and the other shows the time dependence of the count rate computed by fitting the measured data to a diffusion model.

In a manner well known in the relevant technical field, for example as shown in FIGS. 5, 8 and 13 of U.S. Pat. No. 4,760,252, the detector downhole signal processing circuitry of the tool is shown schematically in FIG. 10. FIG. 10 has a dashed vertical line which delineates the hardware and associated processing which occurs downhole, i.e., within the detector and associated electronics carried by the tool 10,100 as distinct from the uphole processing which is performed in a trailer or offsite, in a computer station (not shown).

In the downhole processing, each of the detectors generates an output signal which is amplified in, for example, respective charge sensitive pre-amplifiers 34 and then by the pulse amplifiers 36, with the spectrum of amplified pulses from each detector then being sent to a leading edge discriminator 38 whose output drives a scaler. The capture gamma and thermal count scalers are timing multi-scalers 40, whereas the others 42 are not. The multiscalers 42 sort the pulses into time bins and transmit the count per bin data such as Gi, where i is the bin number, to the surface in digital format. Preferably, a sufficient number of time bins, e.g., 256, is employed to record the entire count versus time curve both during and after each neutron burst, but at least during substantially the full period between bursts. For convenient reference herein, the operation of the downhole circuitry will be referred to as signal processing, and the output from the scalers will be referred to as the detector signal.

With respect to the uphole processing, for convenience this will be referred to as data processing, which is typically performed by digital computers in box 44 and associated peripherals such as plotter 46 using software programs and hardware components that are well known in the art and need not be described further herein. It should be appreciated, however, that the computer programs for controlling the operation of the data processing activity are typically peculiar to each provider of well logging services. It is well within the skill of the typical practitioners in this field, to adapt their respective computer programs to implement the claimed features of the present invention, based on the description contained in this specification including material incorporated by reference. It should also be understood that as used herein, the term "record", whether a verb or noun, refers to information storage on any media, including magnetic, optical, paper, etc.

Inventive Methodology

Figure 11:
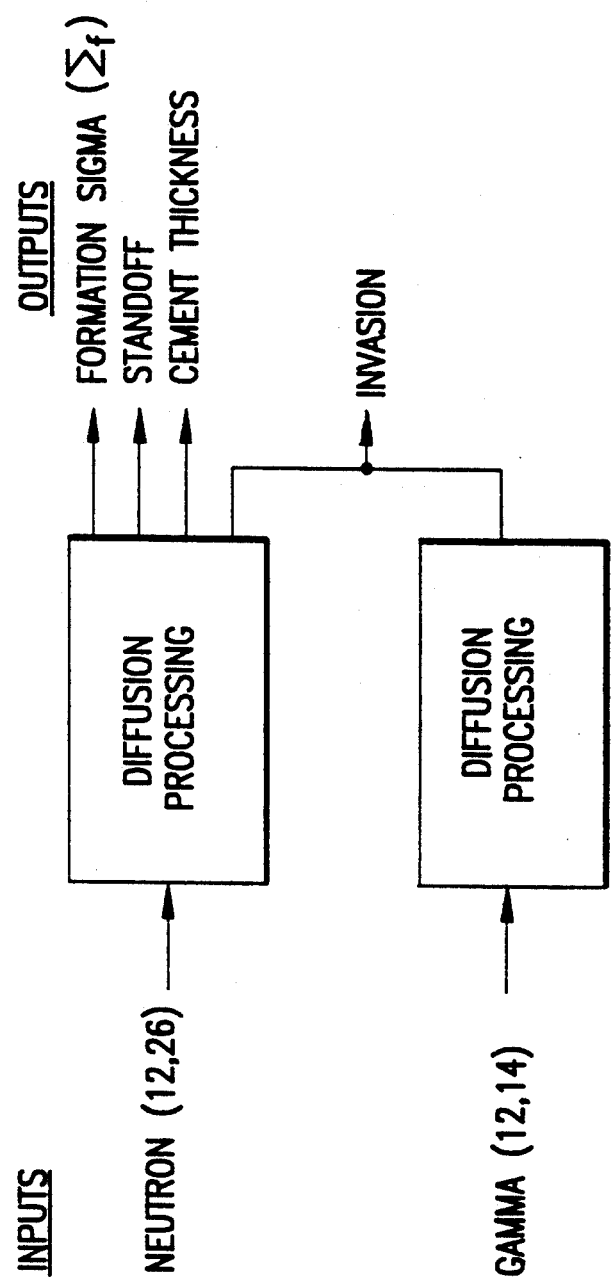
FIG. 11 is a diagrammatic summary of the inputs and outputs of the preferred embodiment of the invention for the tool of FIG. 1.

As shown in FIG. 11, the tool depicted in FIG. 1 is capable of providing outputs for Sigma, standoff, cement thickness and invasion based on the processing of count rate time distributions. Formation and borehole macroscopic absorption cross sections (formation sigma and borehole sigma, respectively), can be determined from the so-called "diffusion processing" of the detector signals obtained in the low energy gamma range in the monitor 14 from source 12, in a manner disclosed generally in U.S. Pat. No. 4,947,040, and the paper by J-R. Olesen et al, "Dual-Burst Thermal Decay Time Data Processing and Examples", published in the SPWLA Twenty-Eighth Annual Logging Symposium, Jun. 29-Jul. 2, 1987.

In accordance with the key feature of the present invention as implemented in the embodiment 10 of FIG. 1, the thermal neutron time distribution signals at a thermal neutron detector 26 from source 12 are similarly data processed to obtain as outputs, one or more determinations of formation sigma, standoff, cement thickness and invasion. In the embodiment 100 shown in FIG. 2, formation sigma can be obtained from one thermal detector 126, without measuring any other formation or borehole characteristic. These outputs are preferably obtained by using the same mathematical representation of the physics of neutron interaction with matter, as is utilized in the diffusion processing model for the gamma count time distributions.

The input data to the computer processing above ground as depicted in FIG. 10 for embodiment 10, includes time decay signals from the gamma and neutron detectors 14,26, normalized count rate signals from the detectors 14,16,22,24 and 20, and a database set-up file containing known properties of the formation and/or its constituents, such as elemental microscopic cross sections, densities and constituents of the borehole fluid, casing, cement and the like, calibration curves for the source and detectors, and other data and correlations well known to those practitioners in this field as would be necessary to solve the neutron diffusion model in the processing block.

In general, this model takes the form $$N(t) = A_B F(t) e^{-t/tauB} + A_F H(t) e^{t/tauF} \quad (1)$$

where, $A_B$, $A_F$ are impulse borehole and formation count rate amplitudes, i.e., neutron slowing down source densities when the decay and diffusion functions are properly normalized;

F(t) and H(t) are non-exponential, generally monotonically decreasing diffusion functions of time which approximate zero value at very long times;

tauB is the decay rate of thermal neutrons in the borehole obtained from the early part of each neutron detector signal;

tauF is the decay rate of thermal neutron in the formation obtained from the late part of each detector signal.

Formation sigma is then equal to 4545/tauF.

For a "delta" or "impulse" function burst of fast neutron and for a two-region, spherically symmetric medium, equation (1) can be approximated as $$N(t) = A_B t^{-g_B} e^{-t/tauB} + A_F t^{-g_F} e^{-t/tauF} \quad (2)$$

where $g_B$, $g_F$ are neutron-gamma ray transport parameters.

The thermal decay time distribution can be processed in real time using a two-component diffusion modified exponential model with an "effective" (i.e., fitted) time constant:

$$1/tau(\text{fit}) = 1/tau(\text{intrinsic}) + 1/tau(\text{diffusion})$$

where tau(diffusion) comes from a tabular look up which is based on borehole size, porosity, and borehole salinity. The value of tau(intrinsic) is derived from the fitted tau. This approach is identical to using Sigma(observed) from:

$$Sigma(obs) = 4545/tau(fit),$$

and then computing an intrinsic sigma from $$Sigma(int) = Sigma(obs) - Sigma(diff).$$

In most cases, where there is no standoff, single component, diffusion corrected processing utilizing the form $$N(t) = A_F t^{-g} e^{-t/tauF} \quad (3)$$

fit over the late part of the thermal neutron decay curve is sufficient.

In parallel, the count rate data of the embodiment of FIG. 1 may be utilized in a conventional manner to compute ratios or cross plots from which porosity of the formation and borehole are determined.

The forgoing hardware and methodology were utilized to analyze a known variety of simulated (laboratory) borehole environments as are summarized in FIG. 12. The Basic Set reference environment has only two regions, an eight inch diameter borehole in a solid limestone formation. The basic variations of the reference conditions included 0, 15 and 40 units of porosity containing water. Another basic variation was the presence of either fresh or saline (200 kppm) borehole fluid. In the basic three region variation of the reference condition, standoffs of 0.0, 0.5, 1.0, 1.5, and 2.0 inches were measured. FIG. 12 also identifies the borehole environment conditions that were varied for conducting testing of the tool in accordance with the present invention. Such variables included lithology, borehole size, thin bed layers, and invasion with associated gas effect.

Figure 14:
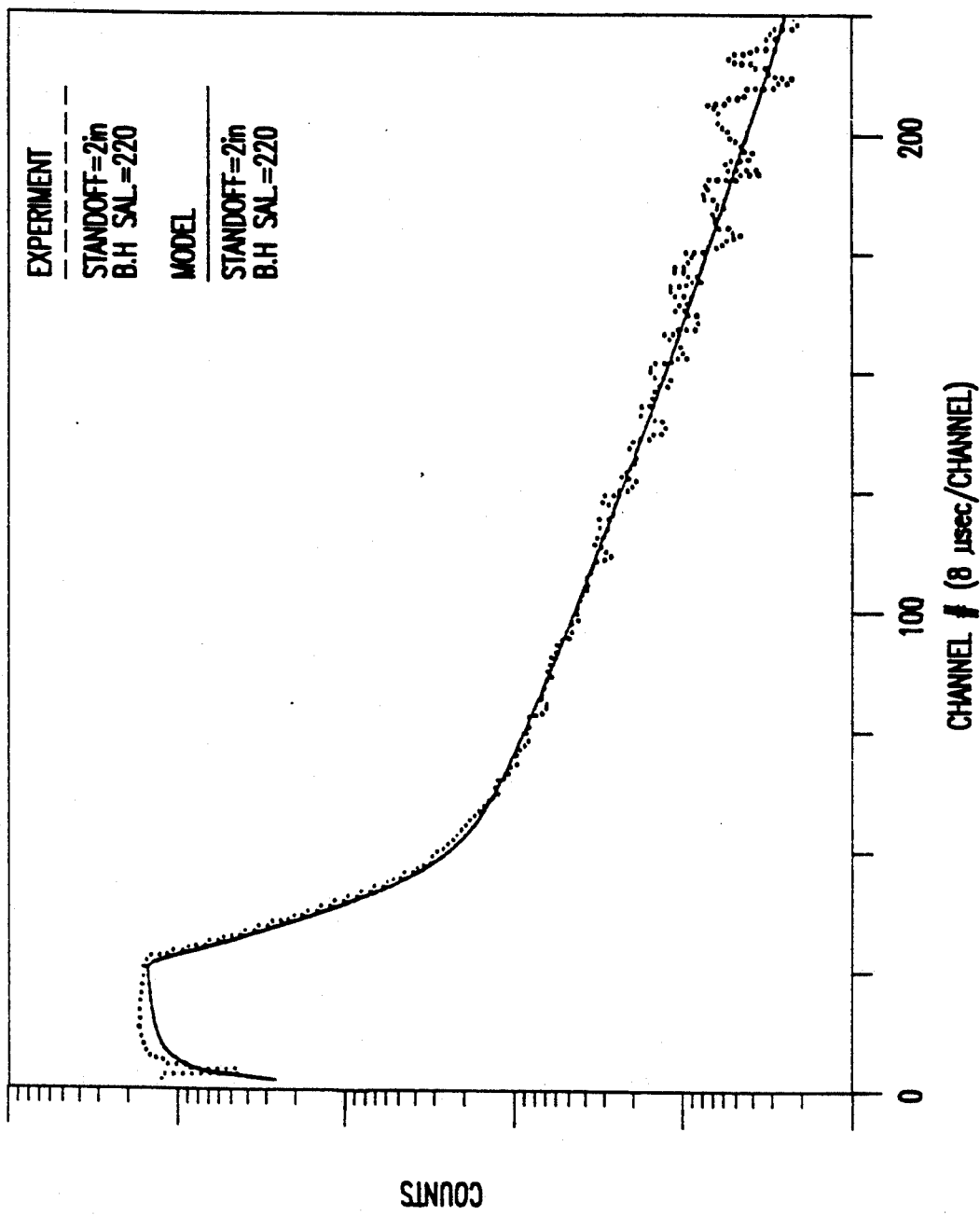
FIG. 14 is a graph showing the time-dependent response of the thermal detector in the tool of FIG. 1, to the same source pulses from which the data of FIG. 13 were obtained, and the count rate curve computed using substantially the same diffusion model applied to the thermal measured data.

FIG. 13 shows the response of monitor 14 to gamma rays resulting from the superposition of many pulses of the neutron source, as a function of time. The ordinate axis indicates the number of counts and the abscissa axis indicates over 200 "time interval bins" or chambers Gi. The conditions are zero porosity limestone with a borehole salinity of 220 and a two inch standoff. FIG. 14 shows the response of the thermal detector 26 in the array of FIG. 1, for the same pulse and conditions shown in FIG. 13. The intrinsic (actual) formation sigma was 11.4, whereas the formation sigma obtained from the reduced parameter diffusion model was 10.6 for the gamma decay data shown in FIG. 13 and 10.7 for the thermal decay curve data of FIG. 14.

Crossover Cases

Figure 24:
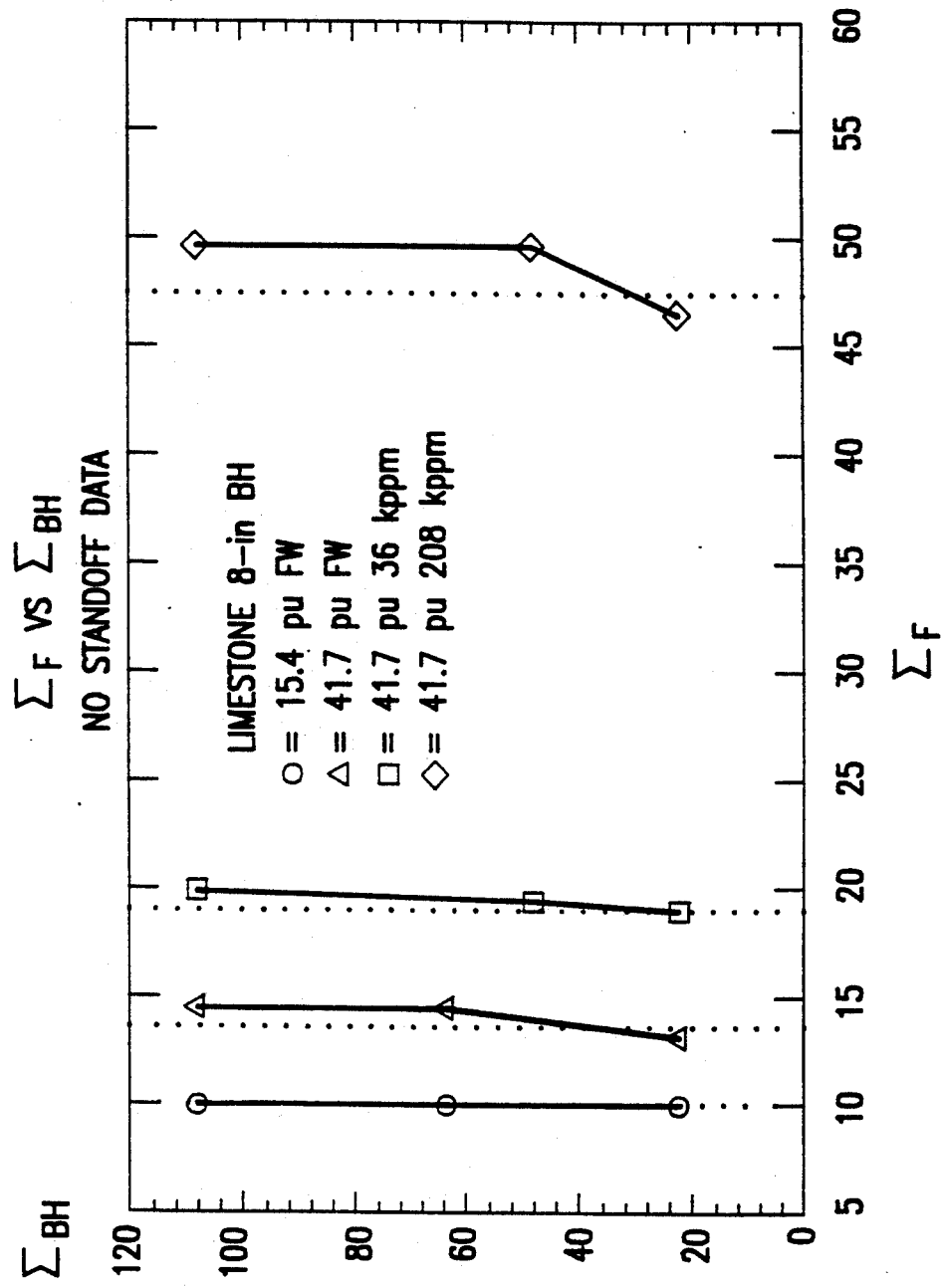
FIG. 24 is a graph showing the effect of borehole sigma relative to formation sigma, on the determination of formation sigma.

Conventional techniques for determining formation sigma exhibit deficient behavior when the formation sigma exceeds the borehole sigma, i.e., in the so-called "crossover" condition. FIG. 24 is a graph which shows the behavior of the sigma measurement made in accordance with the one-component diffusion model of the present invention, as the borehole salinity (sigma) is changed. It can be seen that at any selected formation sigma, increasing the sigma of the borehole results in a computation of formation sigma (represented by the keyed data points), that is higher than the intrinsic formation sigma (represented by the vertical dotted line). One may observe that in the upper portion of the graph, where borehole sigma remains greater than formation sigma, the determination of formation sigma is essentially independent of borehole sigma. As one observes the lower portion of the graph, and particularly the lower right portion, it is clear that the measured formation sigma exhibits a dependence on borehole sigma, especially when the intrinsic formation sigma exceeds the borehole sigma. Nevertheless, the difference of less than ten percent in the measured formation sigma over the changing of conditions in which the intrinsic formation sigma ranges between about one-half and twice the borehole sigma, is a significant improvement relative to known, gamma-based results under similar conditions.

Thus, the tool of the present invention provides informative results even in crossover cases, where conventional tools are not reliable.

Measurement of Standoff

In general, it has been found that the formation sigma computed independently from the responses of the monitor 14 and thermal detector 26 are similar, and the computed formation sigmas are similarly affected by the porosity and salinity. Stated differently, it has been observed that varying the formation porosity or the salinity of the borehole fluid, does not affect the character of the monitor derived decay curves differently from the effect on the character of the thermal detector-derived decay curves.

Figure 15:
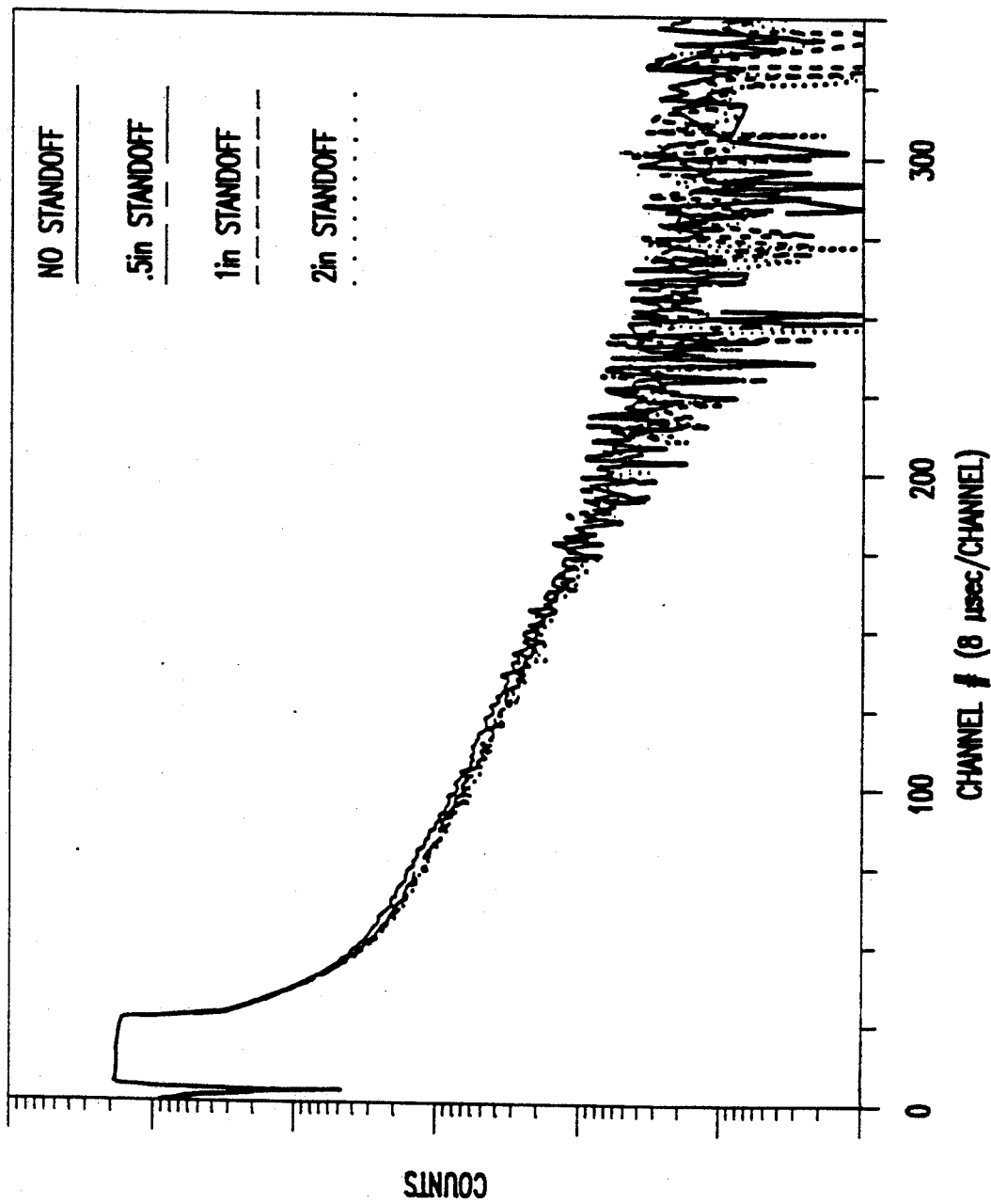
FIG. 15 is a graph showing the time-dependent gamma ray count rate associated with a borehole environment under four different conditions of tool stand-off.
Figure 16:
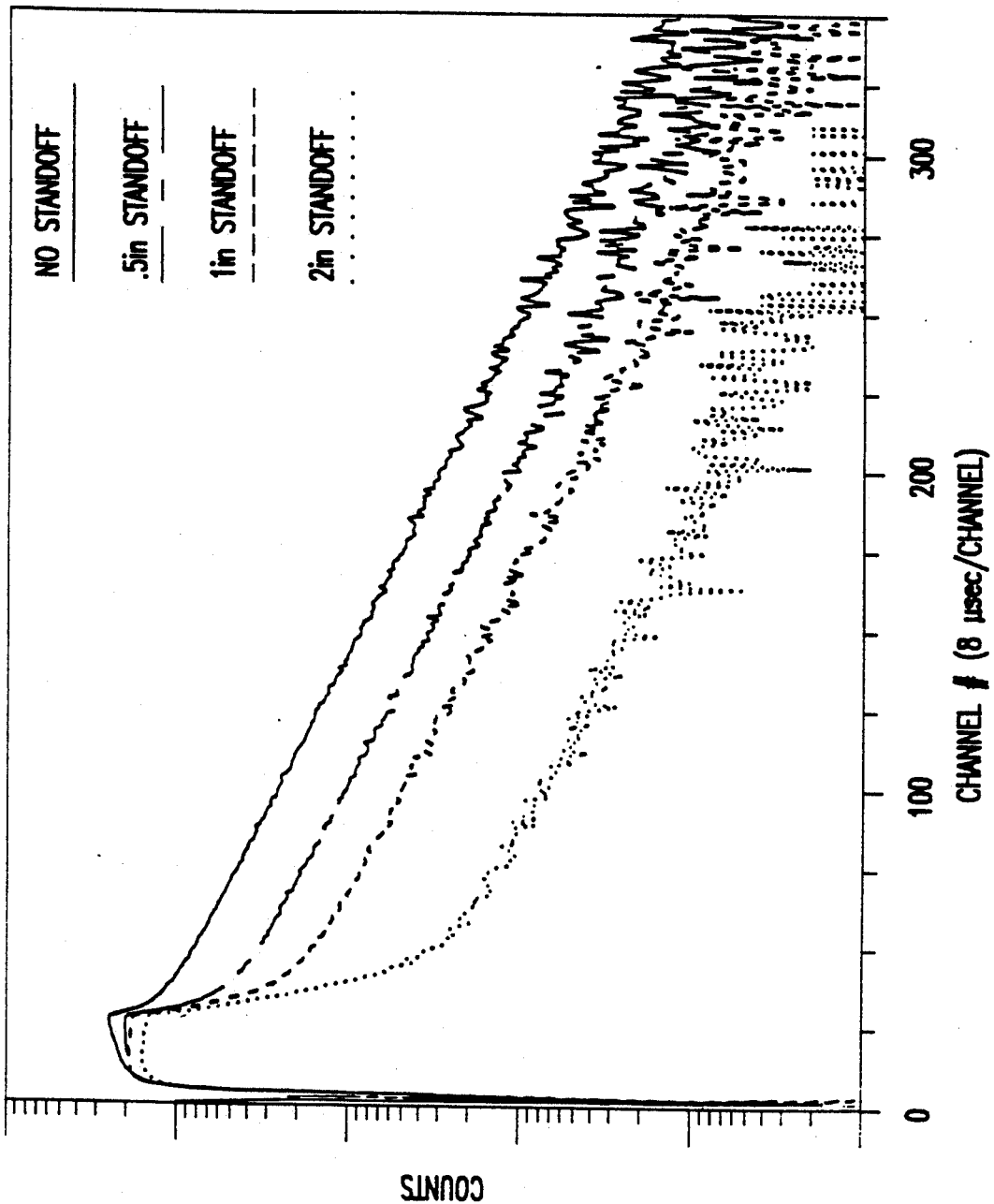
FIG. 16 is a graph showing the time-dependent count rates obtained from the detection of thermal neutrons in the thermal detector the tool of FIG. 1, for the same four stand-off conditions represented in FIG. 15.

As to the variable of standoff, however, the decay curve from the gamma detector 14 is not appreciably affected, whereas the decay curve from the thermal neutron detector 26 is significantly affected. Standoff 206 is considered a characteristic of Region III in FIG. 3. FIG. 15 shows the monitor decay curves for 0, 0.5, 1.0, and 2.0 inch standoff conditions in a limestone formation with 13 units of porosity and an 8 inch borehole having a salinity of 220 kppm. This should be compared with FIG. 16, which shows the decay curves from the thermal detector 26 in the array under the same borehole conditions, where the variations in the decay curve with standoff are quite evident. Similar measurements were performed with 0 PU and 40 PU limestone formations and with fresh and saturated salt water borehole fluid. FIG. 16 shows that the slope of the curve immediately following the pulse is highly dependent on standoff, whereas the slope of the delayed portion of each curve is similar.

The fitted parameters of the diffusion model were examined for sensitivity in reflecting the change in the character of the decay curves. As standoff is varied, the borehole and formation capture cross sections remain substantially the same because they are related to the material constituents of the media. In general, as long as the borehole medium is within the depth of investigation of the thermal neutron or capture gamma ray measurement, the measured capture cross-section will be independent of the thickness of the media. However, the parameter of the diffusion model that is affected most significantly by standoff, is the ratio of the borehole to formation normalized inpulse amplitude. As mentioned above, one indication of the ratio is the slopes from the early and delayed portions of the curve shown in FIG. 16. Preferably, this ratio is the value of $A_B/A_F$, where $A_B$ and $A_F$ are obtained as a result of fitting the models represented by Equations (1) or (2) to the measurement data.

Figure 17:
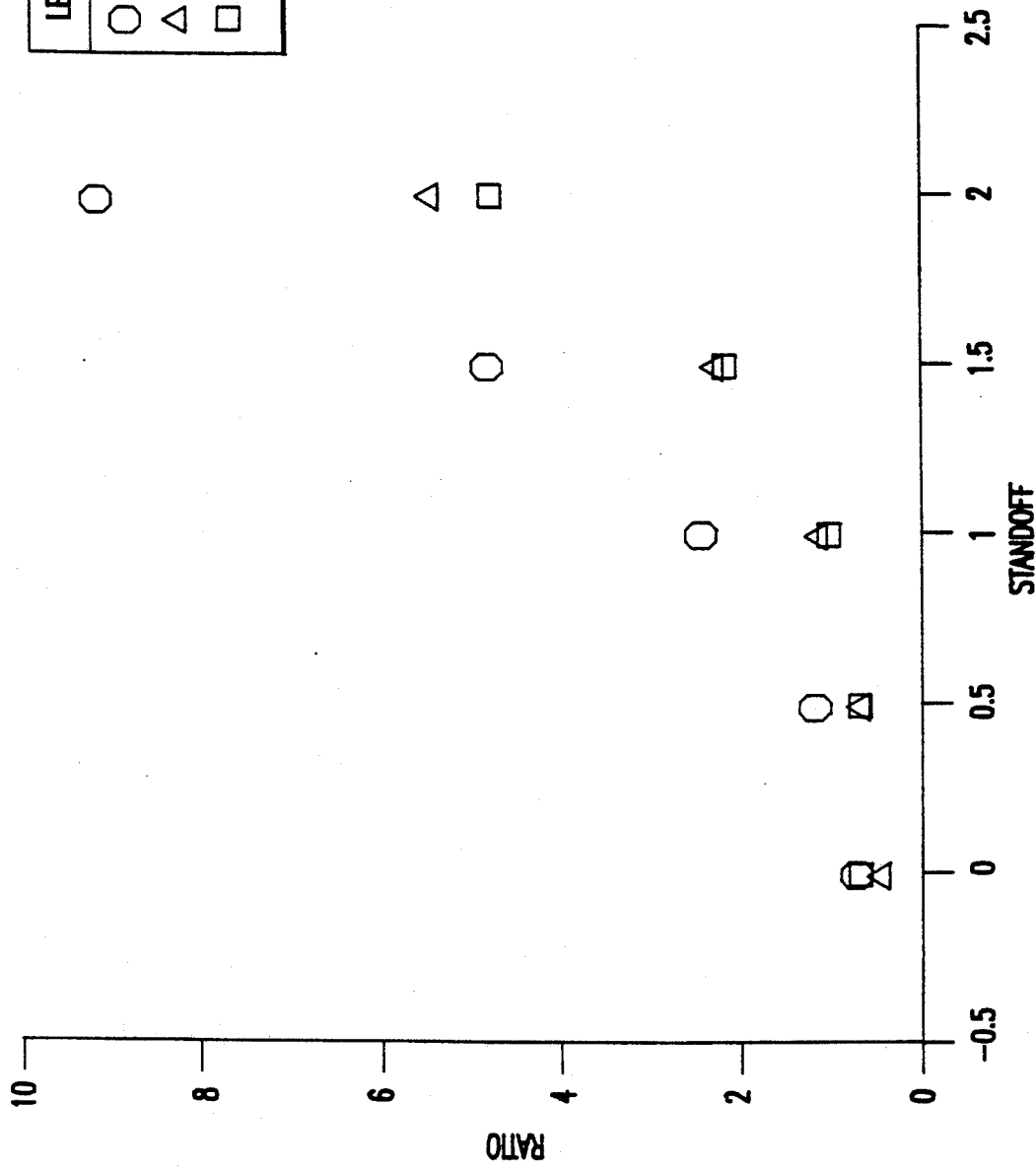
FIG. 17 is a graph showing the amplitude ratios between the initial and delayed count rates associated with the thermal detector in the tool of FIG. 1, for borehole environment conditions that vary with respect to stand-off and formation porosity.
Figure 18:
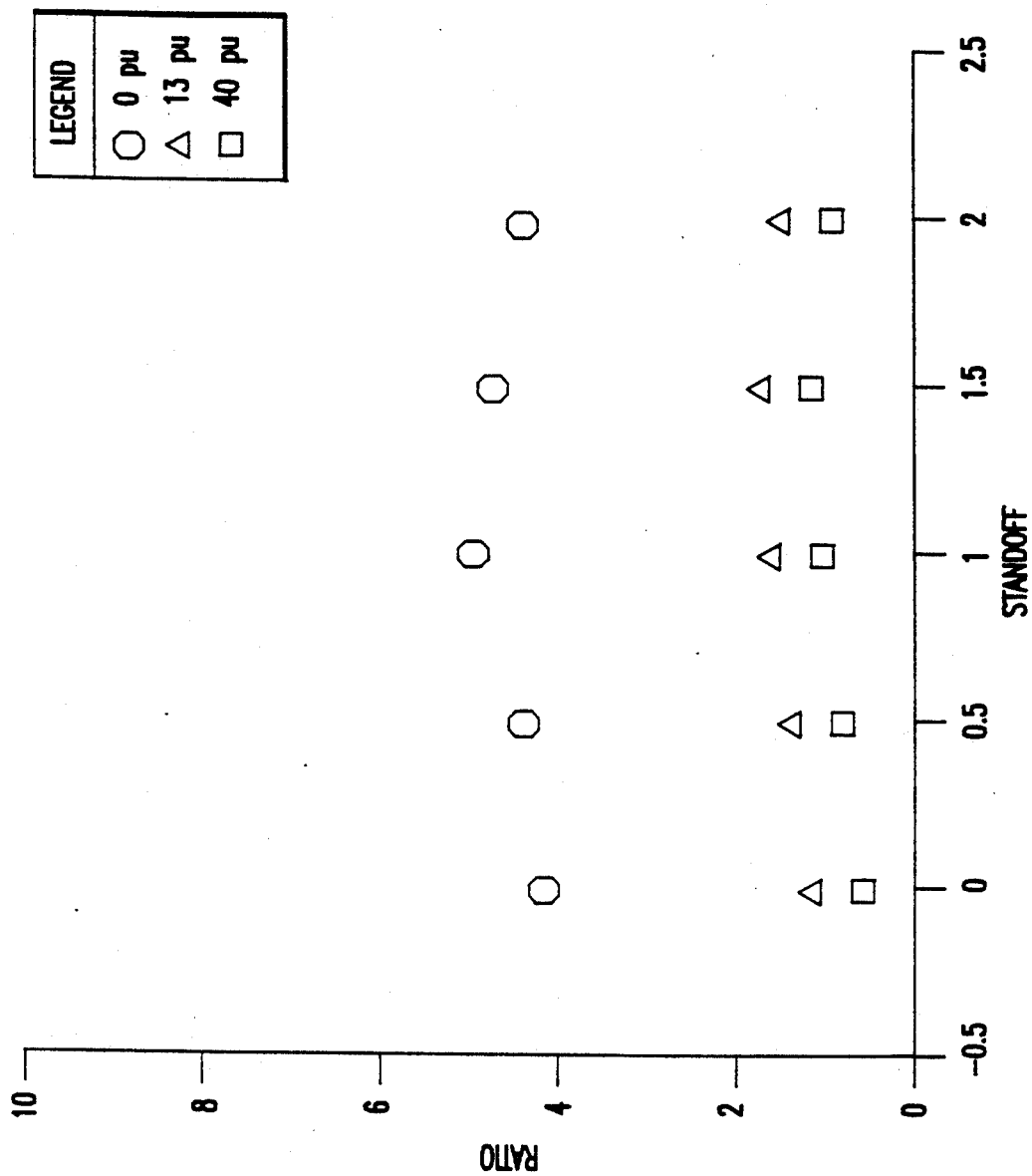
FIG. 18 is a graph showing the amplitude ratios for the same borehole environment conditions as shown in FIG. 17, but from the gamma ray count rate detector.
Figure 19:
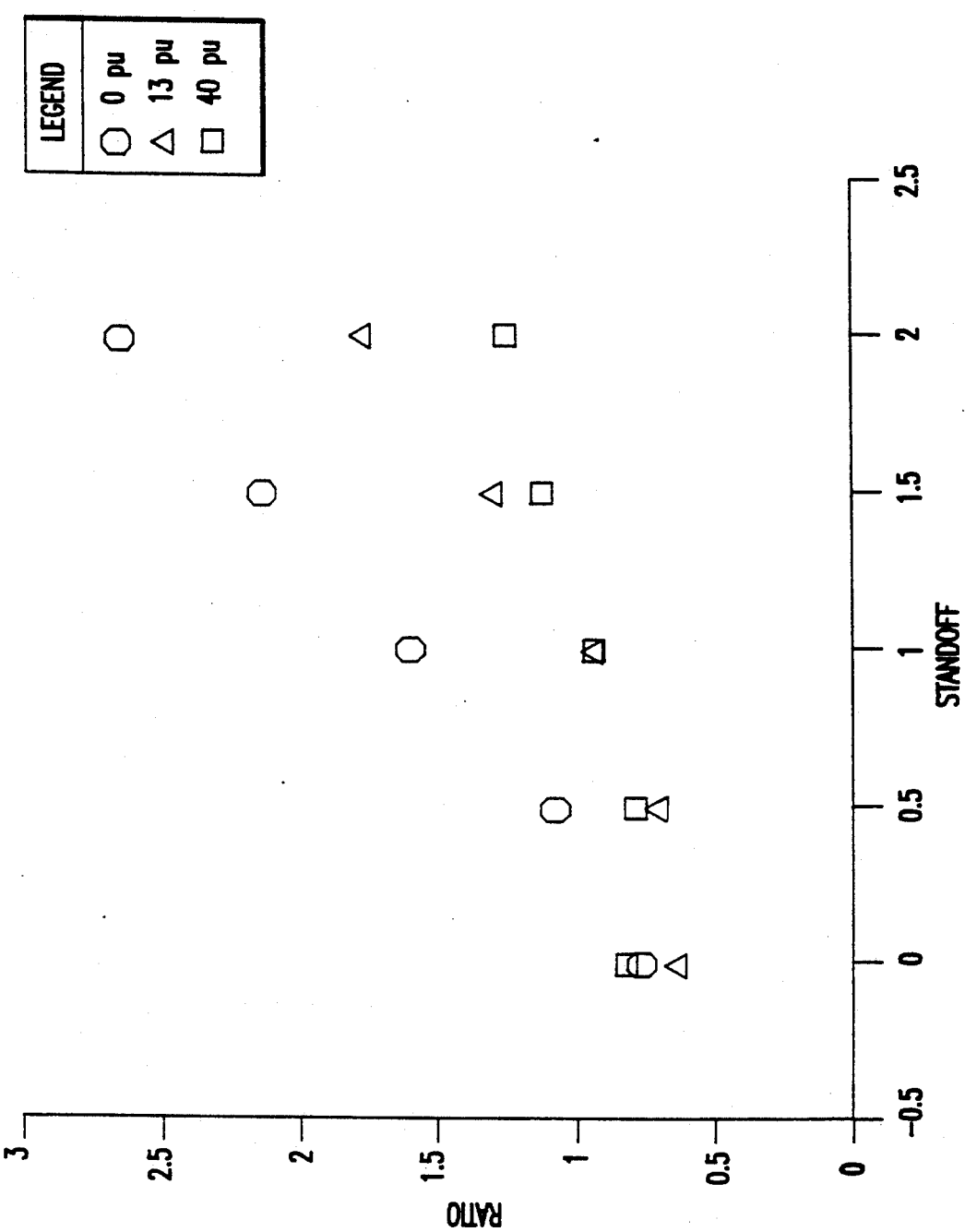
FIG. 19 is a graph showing the response of the thermal detector for the same variations in borehole environment conditions as shown in FIG. 17, but with fresh water as the borehole fluid rather than salt water.

In the neutron detector 26 of the array, this ratio can change significantly with standoff variations, as demonstrated in FIG. 17, where the ratio is shown for standoffs between 0.0 and 2.0 inches over the basic data set with saturated salt in the borehole. By comparison, the gamma response, shown in FIG. 18, is virtually flat. Results shown in FIG. 19 are similar to those shown with FIG. 17, for the thermal array detector when fresh water is in the borehole, although in this instance the dynamic range is not as wide as the case with salt water in the borehole.

In order to provide stable normalized amplitudes over the range of standoff values, single component processing results were used to extract the normalized amplitude information. As a result, cross contamination of amplitudes in the fresh water borehole case will reduce the dynamic range from a factor of 10 to a factor of 5. This limitation of cross contamination of borehole information amplitudes in a single component process can be remedied by corrections for the borehole effect, to restore the dynamic range to its full value. A visible difficulty with this processing is at zero standoff, where the "borehole" component is very small. The early decay constant in this case does not match the Sigma of the borehole. The 0.5 ratio at 0 inches in FIGS. 17 and 19 is too high, an artifact of the processing. The occurrence of an insignificant borehole component can be sensed during processing, and fitting thereto can be avoided. Nevertheless, at present, standoff can be measured, but not without some unwanted influence by the borehole salinity. In any event, the standoff can be measured with the array first detector 26, with a precision of about 0.5 inches.

The relationship between amplitude ratio and standoff, as dependent on borehole fluid salinity, can be stored in the setup database of block 44 of FIG. 10. Thus, the database contains data which relates the amplitude ratio, standoff, salinity, and porosity. The borehole fluid salinity is known a priori, although the salinity of natural fluids which may be trapped in porous material in the formation, is not known a priori. The porosity of the formation, with some high resolution capability, is determined from the epithermal count rates in a conventional manner. Thus, the amplitude ratio, borehole fluid salinity, and local formation porosity are available at least to a first level of approximation. By suitable interpolation of the entries in the database, standoff-correlated porosity can be inferred.

It should be noted that this procedure (standoff determination) works as long as the borehole sigma is approximately equal to or greater than formation sigma. For situations where borehole sigma is less than formation sigma (fresh or oil borehole in a salty formation), this standoff determination is not reliable.

Measurement of Formation Invasion

In another feature of the invention, the invaded zone (Region III) within a three region formation borehole environment (FIG. 3) can be profiled. Invaded zones 206 are a common occurrence resulting from mud filtrates or borehole fluids which tend to invade the region beyond the borehole, displacing the formation fluids. The thermal neutron timing measurements in accordance with the present invention, can lead to detection and measurement of invaded zones by exploiting the fundamental difference in the physics of the measurement between thermal neutron detection by the thermal detector 26 and gamma ray detection by the monitor 14. The early region of the decay curve from the thermal detector 26 responds to the shallow environment 206 around the borehole 202 (up to about four inches). Since the fluid salinity in an invaded zone is different from the formation fluid, there is a measurable difference in the capture cross sections. This Sigma variation is detected by the thermal detector 26. The monitor 14, on the other hand, measures the volume integrated capture cross section of the formation 204 and invaded zone 206.

Figure 20:
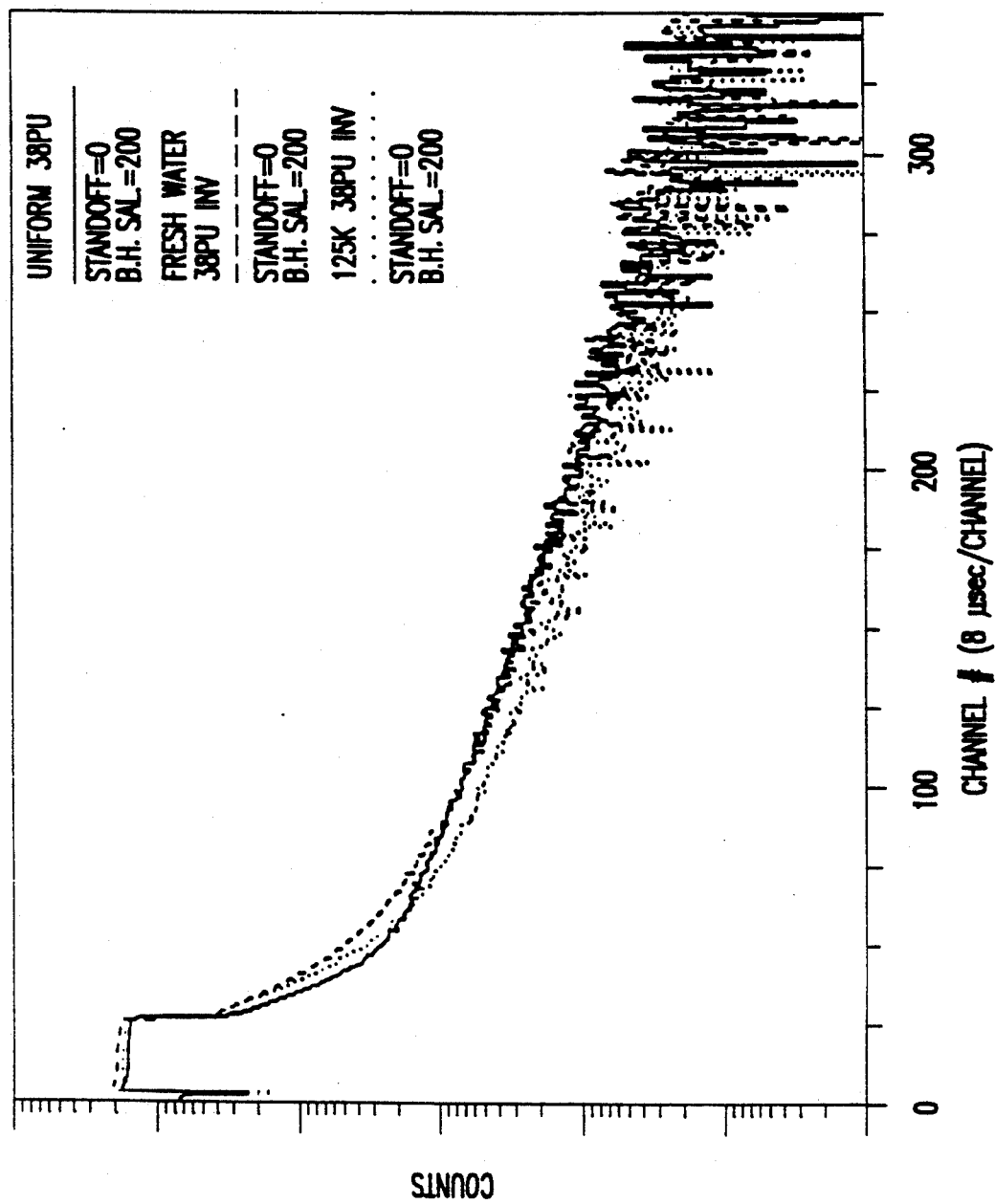
FIG. 20 is a graph showing the response of the gamma-sensitive monitor to a pulsed neutron source, for three different conditions of formation invasion.
Figure 21:
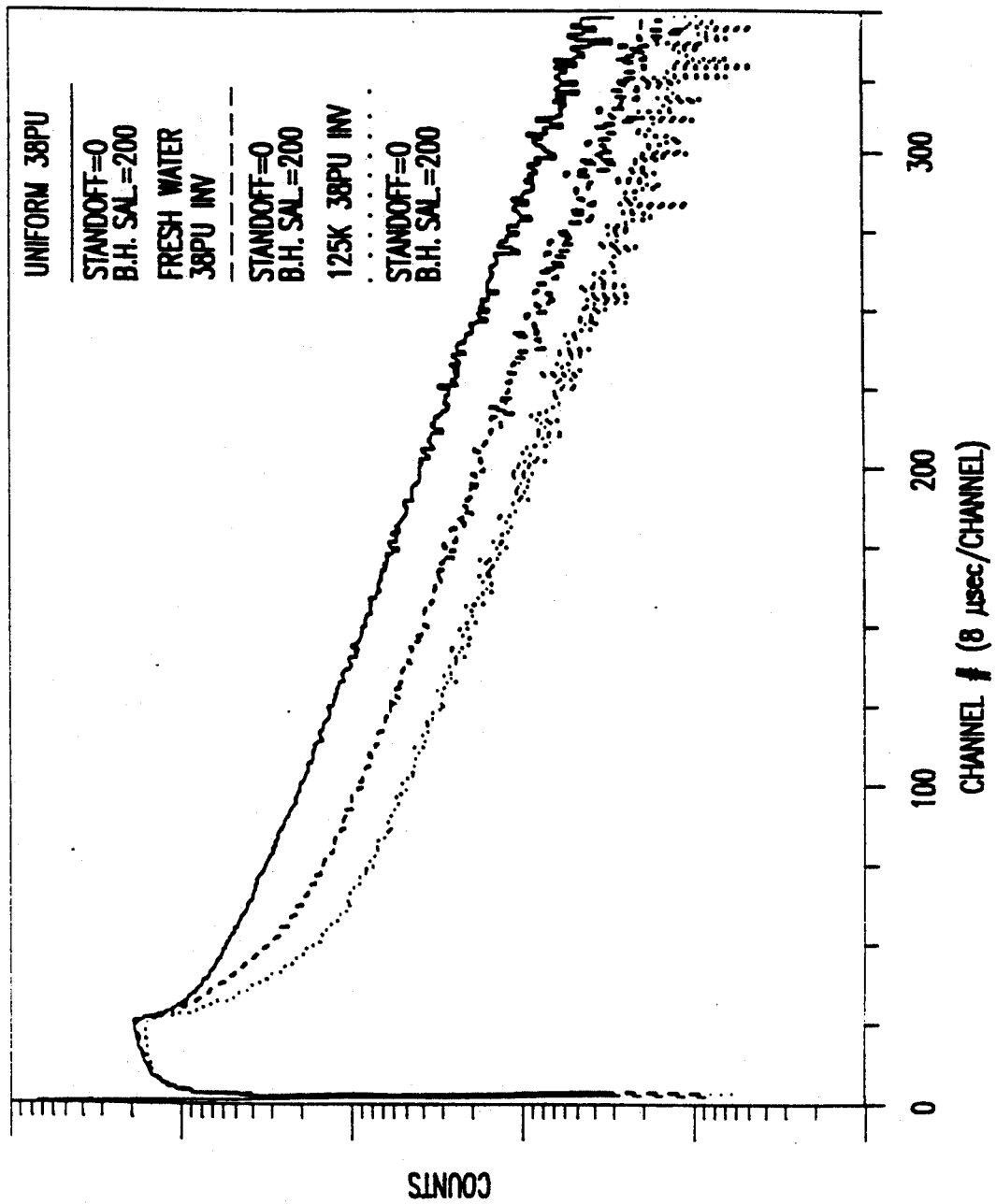
FIG. 21 is a graph showing the response of the thermal detector, to the source pulse and invasion conditions associated with FIG. 20.

FIGS. 20 and 21 show the time distribution data detected by the monitor 14, and thermal detector 26, respectively. The measurements were made through a ten inch borehole having borehole fluid with a salinity of 200 kkpm in a 38 pu limestone formation and zero tool standoff. In each figure, three different conditions are represented as follows: (a) zero invasion by borehole fluid into a dry formation, (b) two inch fresh water invasion of the formation, and (c) two inch invasion of the formation with 125 kppm water. The early time response of the thermal detector 26 shows a significant differences in the inferred sigma. The monitor response, on the other hand, is not as clean and distinguishable. In addition, in the monitor response, the late part of the decay is also affected by the invasion medium. This is because of the diffusion effect which is more pronounced in the monitor due to its closer spacing to the source.

Thus, in accordance with the invention, invasion is accounted for in the porosity measurement by, first, computing porosity by the method described, for example, in connection with FIG. 6 of U.S. Pat. No. 4,760,252 using the output signals from the near and far epithermal detectors. A database containing the relationships based on FIGS. 20 and 21 relates the variables to each other in a way that permits a lookup correction.

Thus, with the present invention, it is possible to measure and detect the invaded zones using the tool 10 as shown in FIG. 1. When standoff and invasion are both present, the detection (and separation) of either region is more complicated. Under these conditions, the difference in the response of the monitor 14 versus the thermal detector 26 can be used to separate out the three region geometry.

Measurement of Thin Beds

Figure 22:
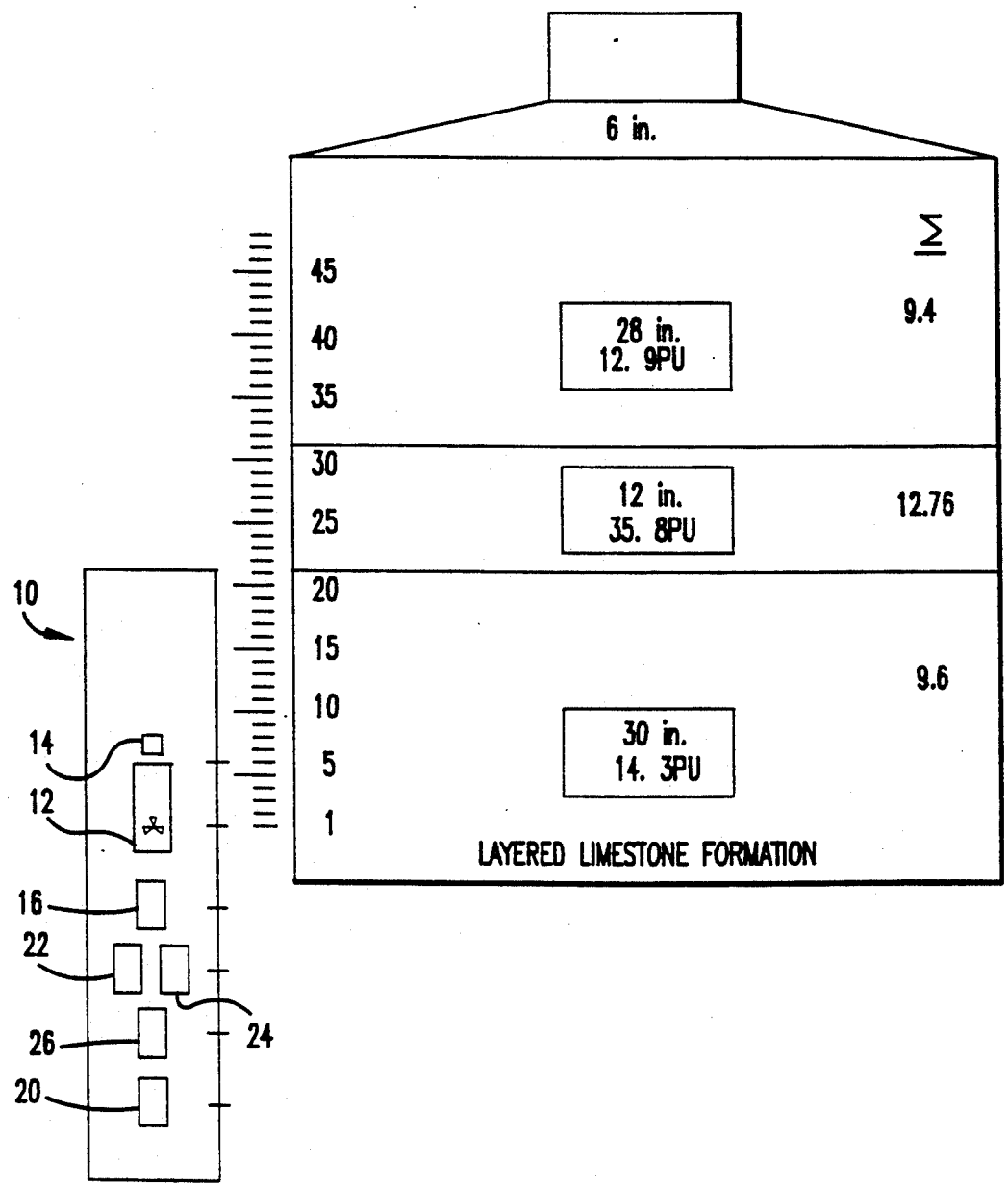
FIG. 22 is a schematic representation of the tool of the present invention as tested in a layered limestone formation having thin-bed layer characteristics.

Another feature of the present invention, was investigated in a special layered formation as shown in FIG. 22. The tool 10 shown in FIG. 1 sampled the formation of FIG. 22 at 1.2 inch intervals. The data were analyzed employing the reduced parameter model for both monitor and thermal detectors. The results of the analysis are shown in FIG. 23.

The monitor 14 measures the capture gamma rays and has a depth of investigation of about one foot, depending on the porosity. In the present embodiment, with a source-detector spacing 12,14 of six inches, the 10-90% transition over the bed is about twelve inches. The thermal detector response, however, is more localized and thus provides an improvement to about six inches in the 10-90% range. In addition, the thermal detector 26 measures the true formation sigmas for the beds. The monitor 14 measures formation sigmas that are integrated over a larger volume and, therefore, are not as close to the intrinsic Sigmas as the results obtained from the thermal detector 26.

Figure 23:
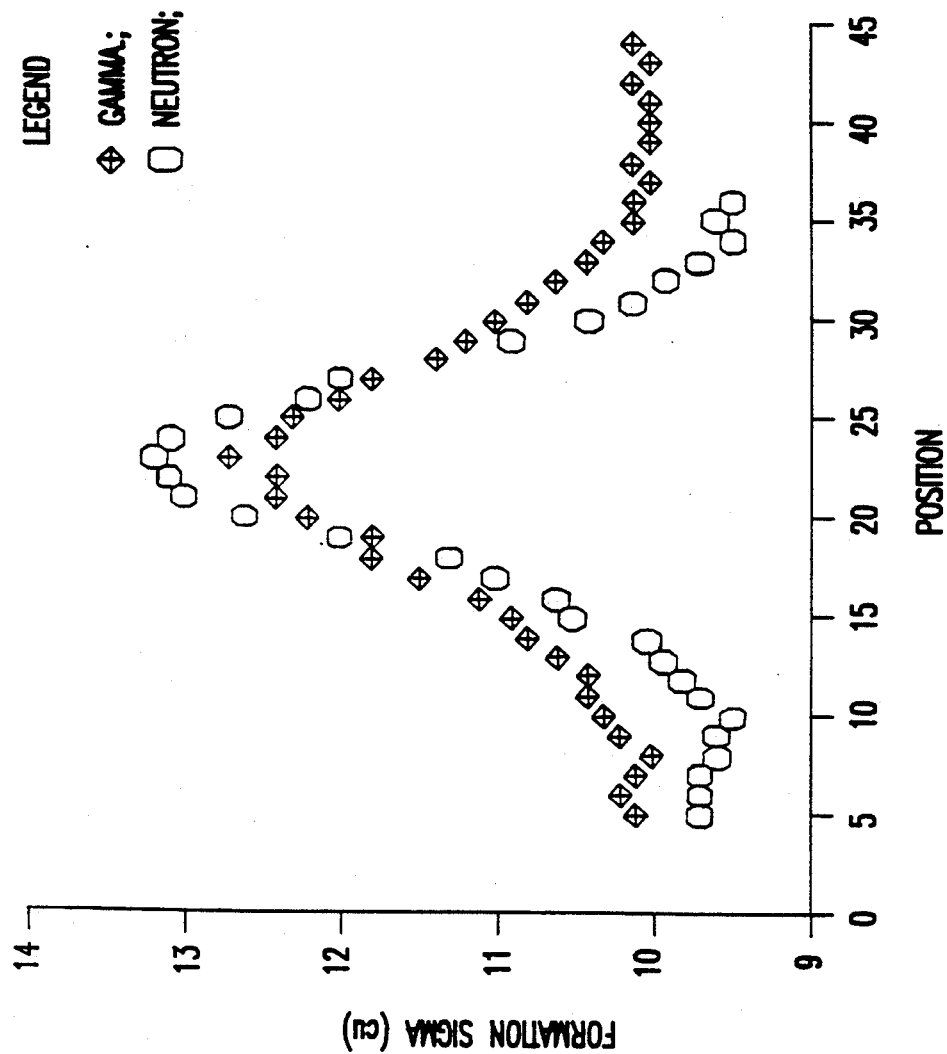
FIG. 23 is a graph showing a comparison of the formation sigma computed with the diffusion model, for the responses of the gamma detector and the thermal detector as a result of logging the formation shown in FIG. 22.

The results shown in FIG. 23 were obtained with salt water in the borehole and one inch of tool standoff. Thin bed response is not affected by standoff. The vertical resolution of the formation sigma in accordance with the invention can be sharpened by using different time intervals from the decay.

Summary of Processing Options

It should be appreciated by one ordinarily skilled in this art, that the tool 100 in accordance with one embodiment of the invention, as depicted in FIG. 2, provides a relatively simple, yet powerful, means for determining formation sigma that, in general, is superior to previously known techniques, particularly with respect to the formation immediately surrounding the borehole. Thus, the tool 100 depicted in FIG. 2, provides improved vertical resolution through reliance on a different physics characteristic relative to previous techniques. Statistical precision is improved because there is no background to subtract. This also helps vertical resolution through shorter data samples. When the borehole is shielded from the measurement, as shown in FIGS. 7 and 8, one can measure the sigma of the region in front of the detector without coupling to the borehole. This provides superior measurement of the formation sigma in crossover case, i.e., when sigma formation is greater than sigma borehole. With such a "focused" measurement, two regions can be identified from the time distribution data: a region immediately in front of the detector (which could include standoff, cement plus casing, invasion) and the formation at a larger distance from the detector.

When the basic components of the tool 100 shown in FIG. 2 are included in a more comprehensive tool 100, such as shown in FIG. 1, a variety of additionally useful information can be obtained from the formation. Of course, the gamma measurement from the tool 10 in FIG. 1 has advantages in applications where a deeper measurement is required (through tubing, thick cement, etc.) and it gives borehole sigma and formation sigma independent of tool positioning and orientation. The significant advantage of the tool 10 of FIG. 1, however, is that, for example, formation sigma can be measured using both the gamma technique and the thermal neutron technique, and a comparison made which can be revealing of formation characteristics which are more difficult to discern from either measurement alone. Moreover, in order to obtain the "best" determination of formation sigma as a function of elevation, it may be desirable to compare the gamma and thermal measurement, assess the nature of any deviation, and select one or the other depending on the nature of the deviation.

Thus, in obtaining the best prediction of sigma formation, a combination of the time-dependent gamma capture count rates and thermal neutron decay count rates can be utilized. The time-dependent gamma counts at a particular position in the borehole during a first period of time between a first set of successive source pulses are detected and a corresponding first detector signal is generated. A second detector signal is generated from the time-dependent population of thermal neutrons at the same position in the borehole during a second period of time between a second set of successive source pulses. It should be appreciated that the gamma detector 14 and thermal detector 26 are spaced apart within the tool by, for example, 18 inches, which is many times greater than the desired vertical resolution of the tool. As the tool is displaced through the borehole, the gamma and thermal detectors will pass a given elevation in the borehole at a different time, such difference being measured on the order of a second. On the other hand, the pulse rate is on the order of milliseconds. Thus, if the tool is activated while being raised vertically through the borehole, the generation of a gamma detector signal corresponding to a particular elevation in the borehole, will have resulted from interaction of neutrons from a source pulse generated at an earlier point in time than the pulse from which the thermal detector signal is obtained for the same elevation in the borehole. This difference in timing is common to well logging and readily accounted for in a conventional manner as part of the uphole processing.

From the first detector signal associated with a particular position in the borehole, a first estimate of sigma formation is computed and recorded, preferably by least-squares fitting to a diffusion model as described above. Similarly, the second signal corresponding to the same position in the borehole is utilized to compute a second estimate of formation sigma. Preferably, the computation is performed using the model in one of the forms of expressions (1), (2), or (3), e.g., diffusion corrected using the single component diffusion model (3) for those cases where there is no standoff. Useful results can, however, also be obtained without including the diffusion functions F(t) and H(t). In a manner well known in this field, the steps of detecting and computing are performed substantially continually for a multiplicity of positions in the borehole, i.e. elevations in the formation. The digital values of the detector signals, intermediate computations of parameters such as impulse amplitude ratios or the like based on the detector signals, and the computed estimates of the desired characteristics such as formation sigma, are recorded in a database, along with other elevation-dependent data.

Either while the tool is on line, or at some later time, these recorded data are utilized to compute the best prediction of the characteristics, e.g., formation sigma, from the first and second estimates at each position in the borehole. In a relatively straightforward method, the first detector signal is compared with the second detector signal at a plurality of positions for which data have been recorded, and for each position, either the first or the second estimate of the formation cross section is recorded as the predicted value. More particularly, in the usual logging operation, the first estimate of formation cross section, based on the gamma detector signal, is recorded as the predicted value, unless the deviation between the first and second detector signals either falls outside a pre-established range, or follows some other pre-established unusual behavior, whereupon the second estimate is recorded as the best, or predicted formation cross section.

It should be appreciated by practitioners in this field, that the comparison which dictates whether the first or second estimate will be deemed the predicted value, can include a comparison of elevation-dependent behaviors of the first and second estimated cross sections, rather than the behaviors of the respective first and second detector signals. Similarly, the comparison could be made between distinct detector signals from the same detector following different pulses spaced apart on the order of one-tenth of a second. Or, the differences in the early and later stages of one detector signal associated with a single pulse can be used. Thus, any number of "cues" can be obtained from the time-dependent behavior of the thermal neutron population following a pulse, which would point to the use of either the gamma-derived or thermal neutron population-derived detector signal and/or computed formation characteristic, as the more accurate at a given elevation in the borehole.

What is claimed is:

1. In a logging system including a sonde for traversing a borehole at a controlled speed between spaced apart elevations in an earth formation, means carried by the sonde for irradiating the formation and generating detector signals indicative of the response of the borehole environment in and around the sonde to the radiation, and data processing means for computing at least one characteristic of the borehole environment from the detector signals, said at least one characteristic including the macroscopic thermal absorption cross section of the formation (formation sigma), the logging method using said sonde comprising the steps of:

(a) irradiating the formation with a pulsed source of high energy neutrons as the sonde traverses the borehole, whereby the neutrons generated at each pulse interact with the borehole environment to produce a neutron population having a space, time and energy distribution including epithermal and thermal energies;

(b) with a detector that has an azimuthally limited angle of receptivity, detecting the time-dependent population of thermal neutrons at an eccentric position in the borehole during a period of time between successive source pulses and generating a thermal neutron detector signal commensurate with said time-dependent population; and (c) from the thermal neutron detector signal, computing the value of formation sigma at the elevation of said eccentric position.

2. The method of claim 1, wherein the step of detecting includes sensing thermal neutrons at said position, with a detector that is eccentrically mounted and back-shielded in the sonde so as to provide said azimuthally limited angle of receptivity around said position.

3. The method of claim 2, wherein said position is substantially at the sidewall of the borehole.

4. The method of claim 3, wherein the step of detecting includes sensing thermal neutrons at said position, from an included azimuthal angle of less than about 100 degrees.

5. The method of claim 1, wherein the step of irradiating includes generating periodic, sharply cutoff neutron pulses.

6. The method of claim 5, wherein the pulses have an intensity of at least about $5 \times 10^8$ n/sec.

7. The method of claim 5, wherein each pulse is substantially a square wave having rise and fall times that are less than about five percent of the pulse duration.

8. The method of claim 5, wherein the duration of each pulse is less than about 25 percent of the pulse period.

9. The method of claim 1, wherein the step of computing includes, mathematically modelling the time-dependent population of thermal neutrons at said position, $N(t)$, with an expression having the form $$N(t) = A_B F(t) e^{-t/tauB} + A_F H(t) e^{-t/tauF}$$

where $A_B$, $A_F$ are impulse borehole and formation count rate amplitudes, i.e., neutron slowing down source densities when the decay and diffusion functions are properly normalized, $F(t)$ and $H(t)$ are non-exponential, generally monotonically decreasing diffusion functions of time which approach zero value with increasing time, tauB is the decay rate of thermal neutrons in the borehole obtained from the early part of each detector signal, and tauF is the decay rate of thermal neutrons in the formation obtained from the late part of each detector signal.

10. The method of claim 9, wherein said position is substantially at the sidewall of the borehole, and the model is simplified to the form in which $A_B = 0$.

11. The method of claim 10, wherein the step of detecting includes sensing thermal neutrons at said position, from an azimuthally limited angle of receptivity of less than about 100 degrees around said position.

12. The method of claim 10, wherein the diffusion function $H(t) = t^{-g}$, where g is a neutron-gamma ray transport parameter.

13. In a logging system including a tool for traversing a borehole in an earth formation, means carried by the tool for irradiating the formation and generating detector signals indicative of the response of the borehole environment in and around the tool to the radiation, and data processing means for computing desired characteristics of the borehole environment from the detector signals, said characteristics including the macroscopic thermal absorption cross section of the formation (formation sigma), the logging method comprising the steps of:

(a) irradiating the formation with a pulsed source of high energy neutrons from the tool as the tool is displaced at a controlled speed through the borehole, whereby the neutrons generated at each pulse thermalize as a result of scattering interactions and are absorbed as a result of thermal neutron capture interactions in the borehole environment, said capture interactions including the production of capture gamma rays;

(b) detecting the time-dependent intensity of capture gamma rays at a particular elevation in the borehole during a first period of time between successive source pulses, and generating a first detector signal commensurate therewith;

(c) detecting the time-dependent population of thermal neutrons at said particular elevation in the borehole during a second period of time between successive source pulses and generating a second detector signal commensurate therewith;

(d) from said first detector signal, computing in said data processing means, and recording, a first estimate of formation sigma at said particular elevation;

(e) from said second detector signal, computing in said data processing means, and recording, a second estimate of formation sigma at said particular elevation;

(f) repeating steps (a)–(e) for a multiplicity of other elevations;

(g) comparing either the first detector signal with the second detector signal, or the first estimate with the second estimate, for a plurality of said multiplicity of elevations; and (h) in response to said comparing, for at least said given elevation, recording one of the first and second estimates of formation sigma as the measured formation sigma.

14. The logging method of claim 13, including the steps of determining whether the comparison is within a permitted specified deviation range and wherein the step (h) of recording includes recording the first estimate as the measured cross section at said elevation unless the deviation exceeds said range.

15. The logging method of claim 13, wherein the steps (b) and (c) include detecting the respective time-dependent changes continually as the tool is displaced through the borehole and the steps (d)–(h) are performed for each of said plurality of elevations corresponding to intervals of less than about three inches in the borehole.

16. The logging method of claim 13, wherein
the system includes means for biasing the tool laterally in the borehole so that one side of the tool is continuously urged against the borehole wall,
step (b) is performed with a detector sensitive to gamma rays and configured to be responsive to the volume averaged number of capture gamma rays generated in the borehole and in the material surrounding the borehole including the material constituting the natural earth formation, and
step (c) is performed with a detector sensitive to thermal neutrons, mounted eccentrically on said one side of the tool so as to be responsive substantially only to the neutron population in the material immediately surrounding the borehole.

17. The logging method of claim 13, wherein the steps (d) and (e) are performed independently of each other using substantially the same mathematical modeling technique in said data processing means.

18. The logging method of claim 13, wherein the steps (d) and (e) of computing include implementing a mathematical model which includes solving the expression $$N(t) = A_B e^{-t/tauB} + A_F e^{-t/tauF}$$

for tauB and tauF and computing the estimated formation sigmas from the relationship $$Sigma_F = \frac{4545}{tauF}$$

where
tauB = decay rate of thermal neutrons in the borehole obtained from one part of each detector signal
tauF = decay rate of thermal neutrons in the formation obtained from another part of each detector signal
$A_B$ = count rate amplitude obtained from one part of each detector signal
$A_F$ = count rate amplitude obtained from another part of each detector signal.

19. The logging method of claim 13, wherein the step (e) of computing includes,
mathematically modelling the time-dependent population of thermal neutrons of said elevation, N(t), with an expression having the form $$N(t) = A_B F(t) e^{-t/tauB} + A_F H(t) e^{-t/tauF}$$

where
$A_B$, $A_F$ are impulse borehole and formation count rate amplitudes, i.e., neutron slowing down source densities when the decay and diffusion functions are properly normalized,
F(t) and H(t) are non-exponential, generally monotonically decreasing diffusion functions of time which approach zero value with increasing time,
tauB is the decay rate of thermal neutrons in the borehole obtained from the early part of each detector signal, and
tauF is the decay rate of thermal neutrons in the formation obtained from the late part of each detector signal.

20. The logging tool of claim 19, further including the steps of determining the normalized neutron source population for each pulse and then normalizing the measurements performed in steps (b) and (c) before performing steps (d) and (e).

21. The logging tool of claim 19, further including the step (i) of computing a formation characteristics at said given elevation selected from the group consisting of porosity, invasion, and standoff, with a dependence on the step (g) of comparing.

22. The logging method of claim 21, wherein the step (i) of computing includes computing the formation porosity.

23. In a logging system including a sonde for traversing a borehole in an earth formation, means carried by the sonde for irradiating the formation and generating detector signals indicative of the response of the borehole environment in and around the sonde to the radiation, and data processing means for computing desired characteristics of the borehole environment from the detector signals, the logging method comprising the steps of:

(a) irradiating the formation with a pulsed source of high energy neutrons from the sonde as the sonde is displaced at a controlled speed through the borehole, whereby the neutrons generated at each pulse interact with the borehole environment to produce a neutron population having a space, time and energy distribution including epithermal and thermal energies;

(b) detecting the population of epithermal neutrons at two positions in the borehole spaced from the source and generating two epithermal detectors signals commensurate therewith;

(c) from the epithermal detector signals, computing an estimate of the characteristic of formation porosity at a given elevation in the borehole;

(d) detecting the time-dependent population of thermal neutrons at an azimuthally limited portion of the exterior surface of the sonde at said elevation in the borehole and generating a thermal neutron detector signal commensurate therewith; and (e) in response to said thermal neutron detector signal, adjusting said estimate of the formation porosity to obtain a measured value of the porosity at said elevation.

24. The logging method of claim 23, wherein the step (e) of adjusting includes measuring the standoff between said exterior surface and the formation at said elevation from said thermal neutron detector signal, and adjusting the estimated porosity in response to variations in the measured standoff.

25. A logging tool for traversing a borehole in an earth formation which has a spatial variation in macroscopic thermal absorption cross-section (formation sigma), comprising:

a generally cylindrical sonde having a longitudinal axis of travel and an exterior surface;

source means mounted in the sonde, for periodically generating a series of pulses of high energy neutrons;

detector means mounted in the sonde at a location axially spaced from the source means, the detector means having a sensitive volume for sensing the time-dependent thermal neutron population at said location following pulses of the source means and means for generating a detector signal commensurate with said time-dependent neutron population;

focus means associated with the detector means, for defining an azimuthally limited detection surface on the exterior surface of the sonde, such that substantially all thermal neutrons that enter the sensitive volume at said location have first passed through the detection surface on the sonde; and signal processing means for fitting the detector signal to a mathematical model of thermal neutron population time dependence at said location when the sonde is operatively situated in the borehole.

26. The logging tool of claim 25, wherein the detector means is mounted eccentrically relative to the sonde axis.

27. The logging tool of claim 25, wherein the focus means includes thermal neutron shielding between the sensitive volume and the sonde axis.

28. The logging tool of claim 25, wherein the source means generates sharp neutron pulses, each pulse having a duration, rise time, and fall time such that the fall time is less than about five percent of the pulse duration.

29. The logging tool of claim 25, wherein the signal processing means includes means for fitting the detector signal by adjusting the parameters tauB and tauF until the detector signal N(t) is substantially matched by the fitting function in the form $$N(t) = A_B F(t) e^{-t/tauB} + A_F H(t) e^{-t/tauF}$$

where $A_B$, $A_F$ are impulse borehole and formation count rate amplitudes, i.e., neutron slowing down source densities when the decay and diffusion functions are properly normalized;

F(t) and H(t) are non-exponential, generally monotonically decreasing diffusion functions of time which approach zero with increasing time;

tauB is the decay rate of thermal neutrons in the borehole obtained from one part of each detector signal; and tauF is the decay rate of thermal neutrons in the formation obtained from another part of each detector signal.

30. The logging tool of claim 29, including means on the exterior of the sonde, for biasing said detection surface against the earth formation as the sonde traverses the borehole.

31. The logging tool of claim 30, wherein the detector means is mounted eccentrically relative to the axis of the sonde such that the sensitive volume is adjacent the sonde exterior surface, the focus means includes thermal neutron shielding between the detector means and the sonde axis, and the signal processing means includes means for recording values of formation sigma responsive to the means for fitting the detector signal.

32. The logging tool of claim 25, wherein the detector means is mounted eccentrically relative to the axis of the sonde such that the sensitive volume is adjacent the sonde exterior surface, and the focus means includes thermal neutron shielding between the detector means and the sonde axis.

33. The logging tool of claim 32, wherein the source means generates sharp neutron pulses, each pulse having a duration, rise time, and fall time such that the rise time and fall time of each pulse is less than about five percent of the pulse duration.

34. The logging tool of claim 32, wherein the signal processing means includes means for computing formation sigma from the fitted model.

35. The logging tool of claim 32, including means responsive to said detector signal commensurate with the time-dependent neutron population, for determining the standoff between said exterior surface of the sonde and the formation when the sonde is operatively situated in the borehole.

36. The logging tool of claim 35, further including second detector means mounted in the sonde at a second location, for measuring the gamma ray population at said second location following pulses of neutrons from the source means;

third detector means mounted in the sonde, for measuring the population of epithermal neutrons at each of spaced apart third and fourth locations in the sonde following pulses of neutrons from the source means;

means for computing an estimated value of formation porosity in response to said measurements of gamma ray population and epithermal neutron population; and means for computing a measured value of formation porosity from said estimated value of formation porosity and said standoff.

37. The logging tool of claim 32, including means on the exterior of the sonde, for biasing said detection surface against the earth formation as the sonde traverses the borehole.

* * * * *